United States Patent
Kim et al.

(10) Patent No.: US 9,520,970 B2
(45) Date of Patent: Dec. 13, 2016

(54) METHOD AND DEVICE FOR INTER CELL INTERFERENCE COORDINATION IN WIRELESS COMMUNICATION SYSTEM

(71) Applicant: LG ELECTRONICS INC., Seoul (KR)

(72) Inventors: Eunsun Kim, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 14/353,476

(22) PCT Filed: Oct. 26, 2012

(86) PCT No.: PCT/KR2012/008861
§ 371 (c)(1),
(2) Date: Apr. 22, 2014

(87) PCT Pub. No.: WO2013/062354
PCT Pub. Date: May 2, 2013

(65) Prior Publication Data
US 2014/0301332 A1    Oct. 9, 2014

Related U.S. Application Data

(60) Provisional application No. 61/551,449, filed on Oct. 26, 2011, provisional application No. 61/596,130, (Continued)

(51) Int. Cl.
*H04L 5/00* (2006.01)
*H04W 72/04* (2009.01)
(Continued)

(52) U.S. Cl.
CPC ............ *H04L 5/0032* (2013.01); *H04J 11/005* (2013.01); *H04J 11/0053* (2013.01);
(Continued)

(58) Field of Classification Search
None
See application file for complete search history.

(56) References Cited

U.S. PATENT DOCUMENTS 8,755,807 B2 *   6/2014   Gorokhov .............. H04B 7/024
                                                        370/329
2008/0167040 A1   7/2008   Khandekar et al.
(Continued)

FOREIGN PATENT DOCUMENTS

JP       2009-081872      4/2009
KR   10-2009-0046686      5/2009
(Continued)

OTHER PUBLICATIONS

Potevio, "Discussion on Scenarios of Carrier Based HetNet ICIC," 3GPP TSG-RAN3 Meeting #73, R3-112062, Aug. 2011, 3 pages.
(Continued)

*Primary Examiner* — Kevin C Harper
*Assistant Examiner* — Derrick V Rose
(74) *Attorney, Agent, or Firm* — Lee Hong Degerman Kang Waimey

(57) ABSTRACT

A method in which a second cell receives subframe pattern information on a first cell according to one embodiment of the present application comprises a step in which uplink almost blank subframe (ABS) pattern information and downlink ABS pattern information on the first cell are received by a second cell, wherein the downlink ABS pattern information is not separated into first and second type ABSs set by the first cell, and the first and second type ABS patterns of the first cell can be identified on the basis of the
(Continued)

downlink ABS pattern information and the uplink ABS pattern information.

13 Claims, 12 Drawing Sheets

Related U.S. Application Data filed on Feb. 7, 2012, provisional application No. 61/600,704, filed on Feb. 19, 2012, provisional application No. 61/601,517, filed on Feb. 21, 2012.

(51) Int. Cl.
| | |
|---|---|
| *H04W 52/24* | (2009.01) |
| *H04J 11/00* | (2006.01) |
| *H04W 52/40* | (2009.01) |
| *H04W 24/08* | (2009.01) |
| *H04W 24/10* | (2009.01) |
| *H04W 52/32* | (2009.01) |
| *H04W 52/38* | (2009.01) |
| *H04W 52/36* | (2009.01) |

(52) U.S. Cl.
CPC .......... *H04L 5/0035* (2013.01); *H04L 5/0053* (2013.01); *H04L 5/0073* (2013.01); *H04W 24/08* (2013.01); *H04W 24/10* (2013.01); *H04W 52/243* (2013.01); *H04W 52/32* (2013.01); *H04W 52/40* (2013.01); *H04W 72/042* (2013.01); *H04W 72/0426* (2013.01); *H04W 52/367* (2013.01); *H04W 52/38* (2013.01); *H04W 72/0446* (2013.01); *Y02B 60/50* (2013.01)

(56) References Cited

U.S. PATENT DOCUMENTS

| | | |
|---|---|---|
| 2010/0323745 A1 | 12/2010 | Chen et al. |
| 2011/0116437 A1 | 5/2011 | Chen et al. |
| 2011/0249642 A1 | 10/2011 | Song et al. |
| 2012/0046056 A1 | 2/2012 | Luo et al. |
| 2012/0087324 A1 | 4/2012 | Kiyoshima et al. |
| 2012/0231790 A1 | 9/2012 | Lindoff et al. |
| 2012/0327884 A1 | 12/2012 | Seo et al. |
| 2013/0153298 A1 | 6/2013 | Pietraski et al. |
| 2013/0244604 A1 | 9/2013 | Yellin |
| 2014/0050154 A1 | 2/2014 | Gunnarsson et al. |
| 2014/0086203 A1 | 3/2014 | Furuskar et al. |
| 2014/0126530 A1* | 5/2014 | Siomina .............. H04W 52/146 370/330 |
| 2014/0286283 A1 | 9/2014 | Kim et al. |

FOREIGN PATENT DOCUMENTS

| | | |
|---|---|---|
| KR | 10-2009-0076745 | 7/2009 |
| KR | 1020110007197 | 1/2011 |
| KR | 1020110040711 | 4/2011 |
| WO | 2010148366 | 12/2010 |
| WO | 2011019835 | 2/2011 |
| WO | 2011034960 | 3/2011 |
| WO | 2011119973 | 9/2011 |
| WO | 2013000311 | 1/2013 |

OTHER PUBLICATIONS

3rd Generation Partnership Project (3GPP), "Technical Specification Group Radio Access Network; Evolved Universal Terrestrial Radio Access Network (E-UTRAN); X2 application protocol (X2AP) (Release 10)," 3GPP TS 36.423 V10.1.0, Mar. 2011, 132 pages.

Ericsson, "Introduction of eICIC support in RAN3 specifications," 3GPP TSG-RAN WG3 #70, R3-103494, Nov. 2010, 3 pages.

PCT International Application No. PCT/KR2012/008861, Written Opinion of the International Searching Authority dated Feb. 15, 2013, 14 pages.

U.S. Appl. No. 14/353,446, Final Office Action dated May 20, 2016, 13 pages.

U.S. Appl. No. 14/353,446, Office Action dated Dec. 23, 2015, 13 pages.

U.S. Appl. No. 14/354,514, Office Action dated Oct. 5, 2015, 13 pages.

PCT International Application Number PCT/KR2012/008874, Written Opinion of the International Searching Authority dated Mar. 4, 2013, 17 pages.

PCT International Application Number PCT/KR2012/008862, Written Opinion of the International Searching Authority dated Feb. 25, 2013, 16 pages.

U.S. Appl. No. 14/353,446, Office Action dated Jul. 28, 2016, 13 pages.

* cited by examiner

FIG. 6
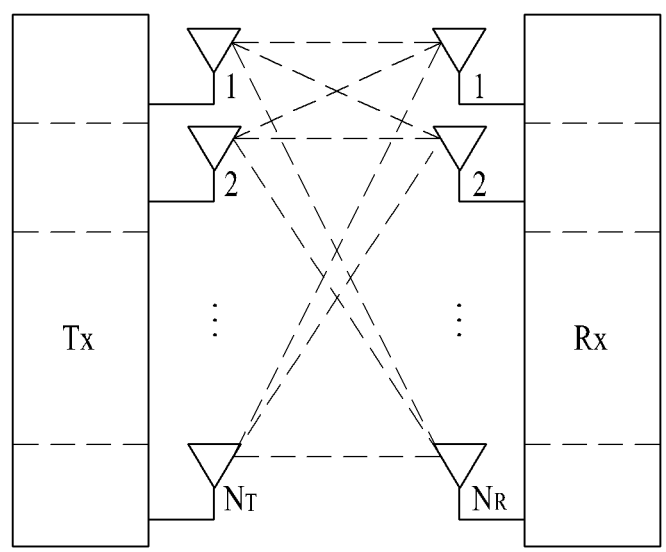
(a)
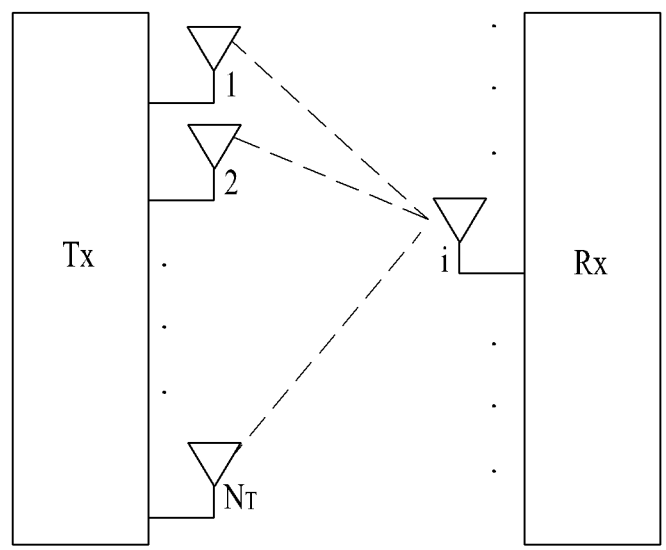
(b)

FIG. 7
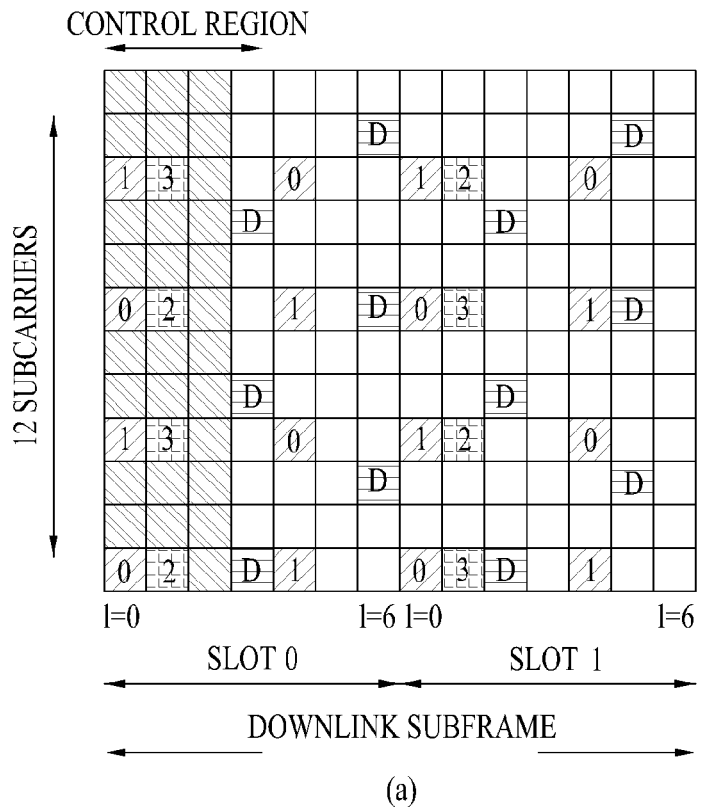
(a)
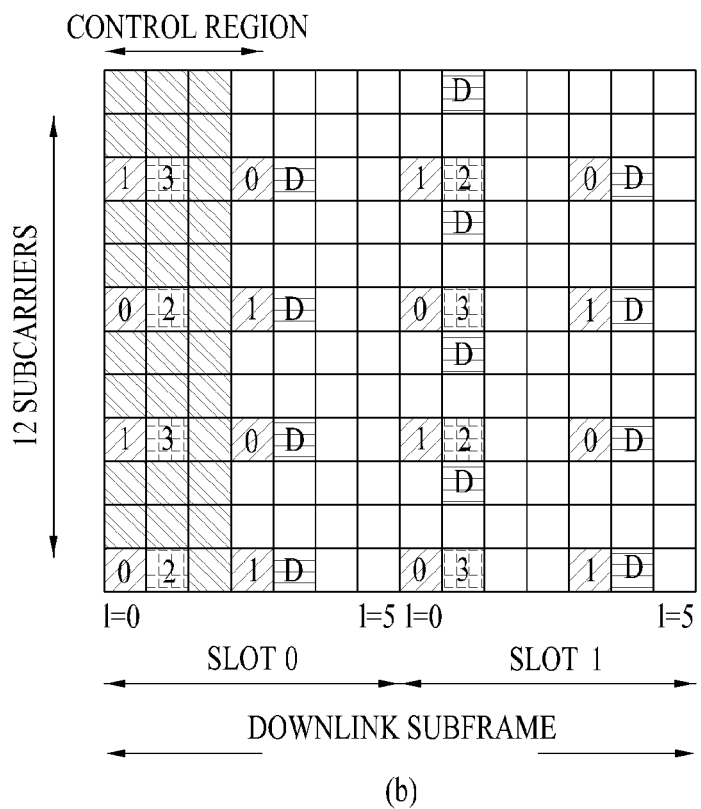
(b)

METHOD AND DEVICE FOR INTER CELL INTERFERENCE COORDINATION IN WIRELESS COMMUNICATION SYSTEM

CROSS-REFERENCE TO RELATED APPLICATIONS

This application is the National Stage filing under 35 U.S.C. 371 of International Application No. PCT/KR2012/008861, filed on Oct. 26, 2012, which claims the benefit of U.S. Provisional Application Ser. Nos. 61/551,449, filed on Oct. 26, 2011, 61/596,130, filed on Feb. 7, 2012, 61/600,704, filed on Feb. 19, 2012 and 61/601,517, filed on Feb. 21, 2012, the contents of which are all hereby incorporated by reference herein in their entirety.

TECHNICAL FIELD

The following description relates to a wireless communication system and, more particularly, to a method and device for controlling and mitigating inter-cell interference in a wireless communication system.

BACKGROUND ART

FIG. 1 illustrates a heterogeneous network wireless communication system 100 including a macro eNB eNB1 and a micro eNB eNB2. In the specification, a heterogeneous network refers to a network in which a macro eNB 110 and a micro eNB 120 coexist while using the same radio access technology (RAT).

The macro eNB 110 refers to a normal eNB of a wireless communication system and has wide coverage (service provision area) and high transmit (Tx) power. The macro eNB 110 may be referred to as a macro cell. The micro eNB 120 may be referred to as a micro cell, a pico cell, a femto cell, a home eNB (HeNB), a relay, etc. The micro eNB 120 is a small version of the macro eNB and may independently operate while performing most functions of the macro eNB. The micro eNB is a non-overlay type eNB that may be overlaid in the coverage area of the macro eNB or in a shadow area which is not covered by the macro eNB. The micro eNB 120 may serve fewer UEs with narrower coverage and lower Tx power than the macro eNB 110.

A UE 130 may be directly served by the macro eNB 110 (the UE being referred to as a macro-UE in this case) or served by the micro eNB 120 (the UE being referred to as a micro-UE in this case). The UE 130 located in the coverage of the micro eNB 120 may be served by the macro eNB 110. FIG. 1 shows a case in which the UE 130 is connected to the micro eNB 120.

The micro eNB may be classified into two types: a closed subscriber group (CSG) micro eNB and an open access (OA) or open subscriber group (OSG) micro eNB according to whether UE access is restricted. The CSG micro eNB can serve only an authorized UE and the OSG micro eNB can serve all UEs without access restriction.

DISCLOSURE

Technical Problem

As illustrated in FIG. 1, when the UE 130 served by the micro eNB 120 in the heterogeneous network receives a desired signal from the micro eNB 120, interference may be generated in the signal received by the UE 130 by a strong signal from the macro eNB 110. Otherwise, when a UE served by the macro eNB is located in proximity to the micro eNB, interference may be generated in a signal received by the UE from the macro eNB by a strong signal from the micro eNB. This interference may be referred to as inter-cell interference. The aforementioned example relates to inter-cell interference generated on downlink from an eNB to a UE. Similarly, inter-cell interference may be generated on uplink from a UE to an eNB.

In a conventional wireless communication system, a cell that causes interference does not perform downlink data transmission in a specific subframe to mitigate interference applied to a neighboring cell. A method of improving system performance while reducing interference applied to a neighboring cell by performing downlink data transmission with reduced Tx power rather than not-performing downlink data transmission is under discussion.

Information indicating application of strong uplink interference to a specific frequency resource or information indicating that uplink transmission that causes strong interference in a specific frequency resource can be scheduled may be used for inter-cell interference coordination in the frequency domain.

In this case, when a downlink subframe is set such that transmission is not performed in the downlink subframe, it can be considered that uplink transmission is not performed in an uplink subframe related to the downlink subframe. For example, while ACK/NACK information indicating whether downlink data has been successfully received can be transmitted in a subframe n+k when the downlink data is transmitted in a subframe n, it can be considered that uplink transmission is not performed in the subframe n+k when downlink data transmission is not carried out in the subframe n according to inter-cell interference coordination. In this case, information for inter-cell interference coordination in the frequency domain is ignored since uplink transmission is not performed in the subframe n+k.

However, when downlink transmission is performed with reduced Tx power in a downlink subframe, as described above, uplink transmission may be performed in the uplink subframe related to the downlink subframe. That is, when a subframe in which downlink transmission is not performed and a subframe in which downlink transmission is carried out with reduced Tx power coexist, ambiguity about how uplink inter-cell interference coordination information is interpreted is generated.

An object of the present invention is to provide a method for correctly interpreting uplink frequency domain inter-cell interference coordination information. Another object of the present invention is to provide a method for determining a downlink subframe pattern using a subframe pattern in which uplink transmission is not performed.

The technical problems solved by the present invention are not limited to the above technical problems and those skilled in the art may understand other technical problems from the following description.

Technical Solution

The object of the present invention can be achieved by providing a method for receiving, by a second cell, subframe pattern information on a first cell, including: the second cell receiving downlink almost blank subframe (ABS) pattern information and uplink ABS pattern information on the first cell, wherein the downlink ABS pattern information does not discriminate first and second type ABSs set by the first cell from each other, wherein the first and second type ABSs of the first cell are identified based on the downlink ABS pattern information and the uplink ABS pattern information.

In another embodiment of the present invention, provided herein is an eNB of a second cell for receiving subframe pattern information on a first cell, including: a transmission module for transmitting a signal to the outside; a reception module for receiving a signal from the outside; and a processor for controlling the eNB, wherein the processor is configured to receive downlink ABS pattern information and uplink ABS pattern information on the first cell through the reception module, wherein the downlink ABS pattern information does not discriminate first and second type ABSs set by the first cell from each other, wherein the first and second type ABSs of the first cell are identified based on the downlink ABS pattern information and the uplink ABS pattern information.

The following may be commonly applied to the above-described embodiments of the present invention.

A subframe n may be identified as the first type ABS when the subframe n is indicated as an ABS in the downlink ABS pattern information and a subframe n+k is indicated as an uplink ABS in the uplink ABS pattern information, and the subframe n may be identified as the second type ABS when the subframe n is indicated as an ABS in the downlink ABS pattern information and the subframe n+k is not indicated as an uplink ABS in the uplink ABS pattern information. Here, k may be 4.

The first type ABS may be a zero power-ABS (z-ABS) and the second type ABS may be a reduced power-ABS (r-ABS).

ABS status information on the uplink ABS may be fed back from the second cell to the first cell.

In another embodiment of the present invention, provided herein is a method for receiving, by a second cell, subframe pattern information on a first cell, including: the second cell receiving downlink ABS pattern information on the first cell and Tx power information on a downlink ABS, wherein the downlink ABS pattern information discriminates first and second type ABSs set by the first cell from each other, wherein an uplink ABS pattern on the first cell is identified based on the first and second type ABSs.

In another embodiment of the present invention, provided herein is an eNB of a second cell for receiving subframe pattern information on a first cell, including: a transmission module for transmitting a signal to the outside; a reception module for receiving a signal from the outside; and a processor for controlling the eNB, wherein the processor is configured to receive downlink ABS pattern information on the first cell and Tx power information on a downlink ABS through the reception module, wherein the downlink ABS pattern information discriminates first and second type ABSs set by the first cell from each other, wherein an uplink ABS pattern on the first cell is identified based on the first and second type ABSs.

The following may be commonly applied to the above-described embodiments of the present invention.

A subframe n+k may be identified as an uplink ABS when a subframe n corresponds to the first type ABS, and the subframe n+k may be identified as an uplink normal subframe when the subframe n corresponds to the second type ABS. Here, k may be 4.

The first cell may transmit a frequency domain inter-cell interference coordination (ICIC) message to the second cell.

It may be determined that the frequency domain ICIC message with respect to the subframe n+k is not valid when the subframe n corresponds to the first type ABS, and it may be determined that the frequency domain ICIC message with respect to the subframe n+k is valid when the subframe n corresponds to the second type ABS. Here, k may be 4.

The frequency domain ICIC message may include at least one of interference overload indication (IOI) and high interference indication (HII).

The first type ABS may correspond to a z-ABS and the second type ABS may correspond to an r-ABS.

The above description and the following detailed description of the present invention are exemplary and are for additional explanation of the invention disclosed in the claims.

Advantageous Effects

According to the present invention, it is possible to provide a method for correctly interpreting uplink frequency domain inter-cell interference coordination information. In addition, it is possible to provide a method for determining a downlink subframe pattern using a subframe pattern in which uplink transmission is not performed.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 6 illustrates configurations of wireless communication systems including multiple antennas;

FIG. 7 illustrates CRS and DRS patterns defined in 3GPP LTE;

BEST MODE

Figure 1:
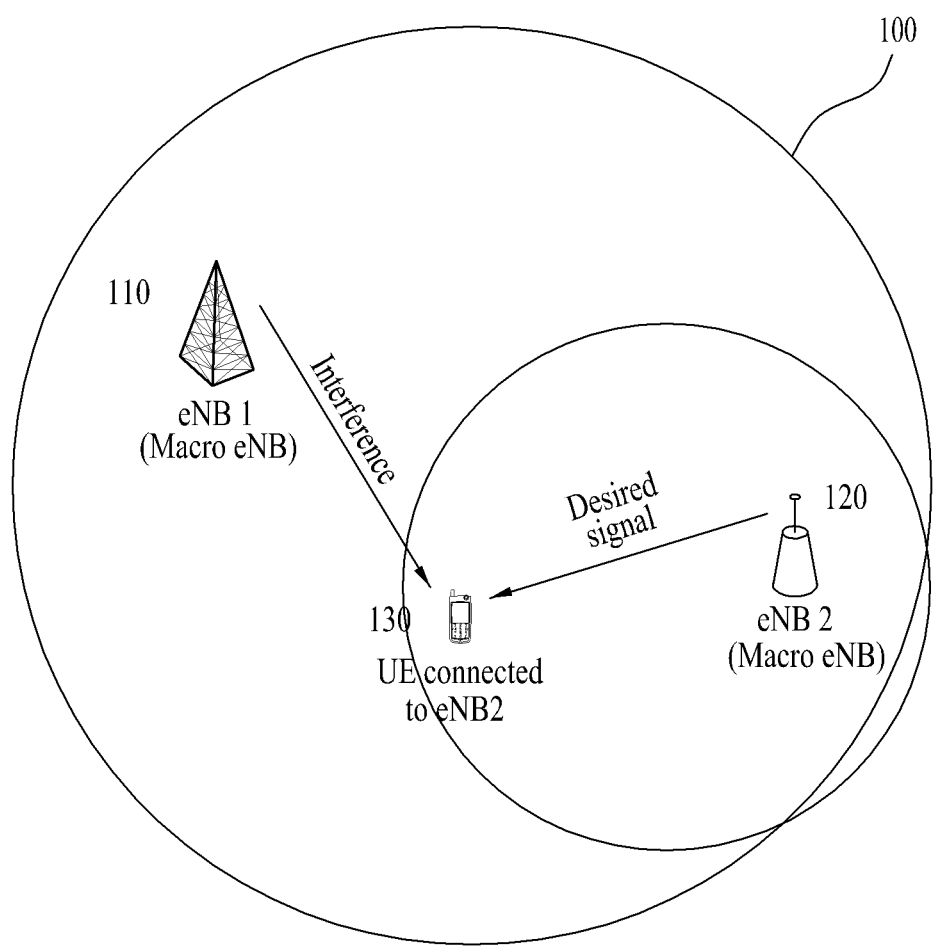
FIG. 1 illustrates a heterogeneous network wireless communication system.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged.

Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

Figure 2:
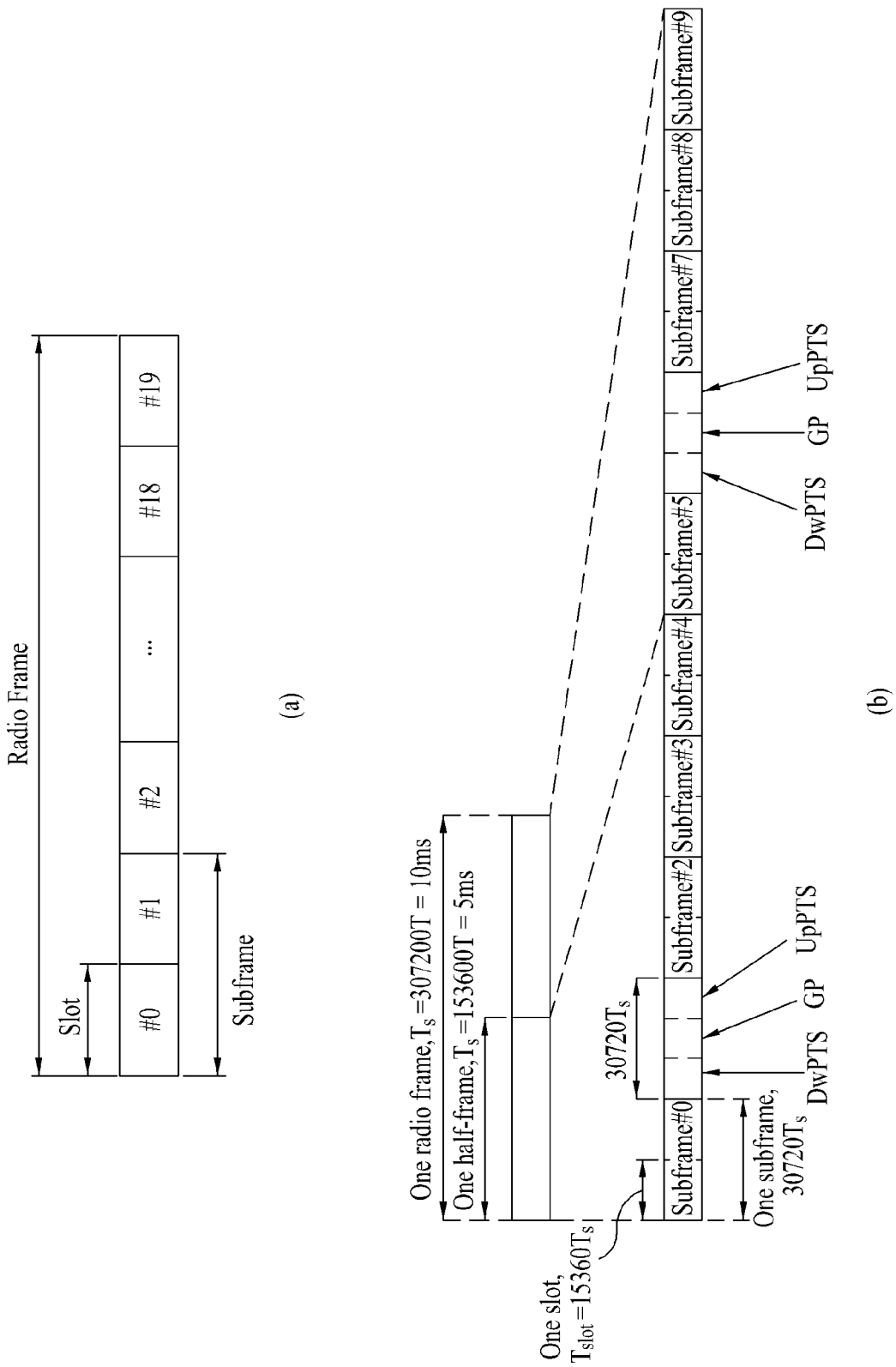
FIG. 2 illustrates a downlink radio frame structure.

A description will be given of a downlink radio frame structure with reference to FIG. 2.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 2(a) illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first two or three OFDM symbols in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 3:
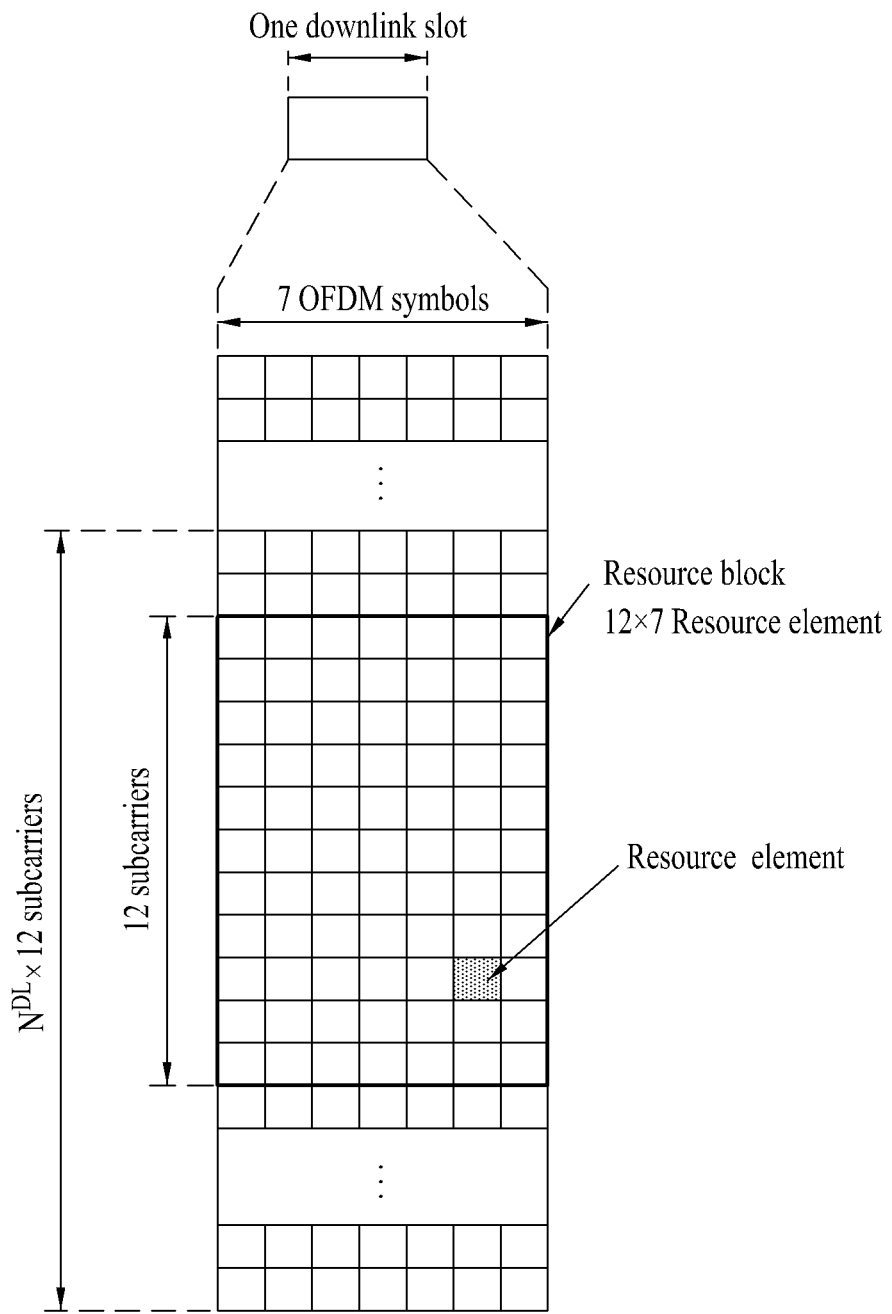
FIG. 3 illustrates a resource grid in a downlink slot.

FIG. 3 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number $N_{DL}$ of RBs included in the downlink slot depends on a downlink transmit bandwidth. The structure of an uplink slot may be same as that of the downlink slot.

Figure 4:
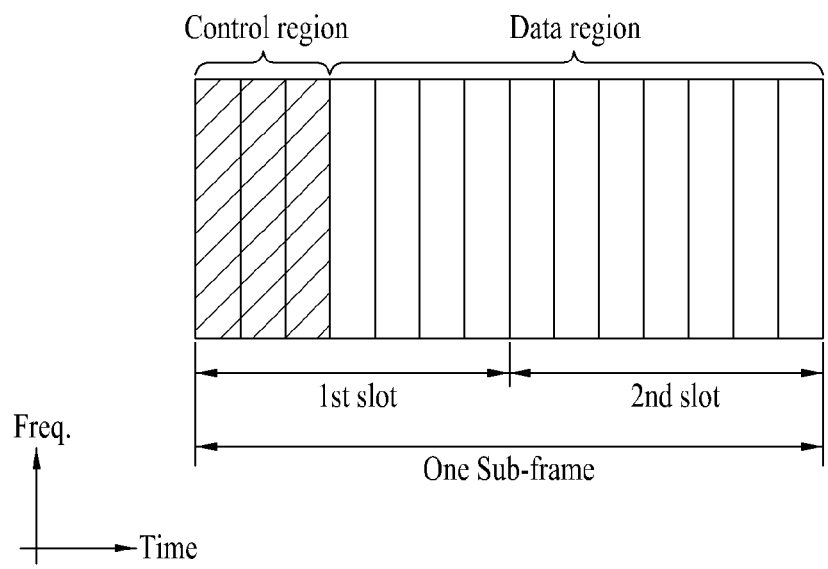
FIG. 4 illustrates a downlink subframe structure.

FIG. 4 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 5:
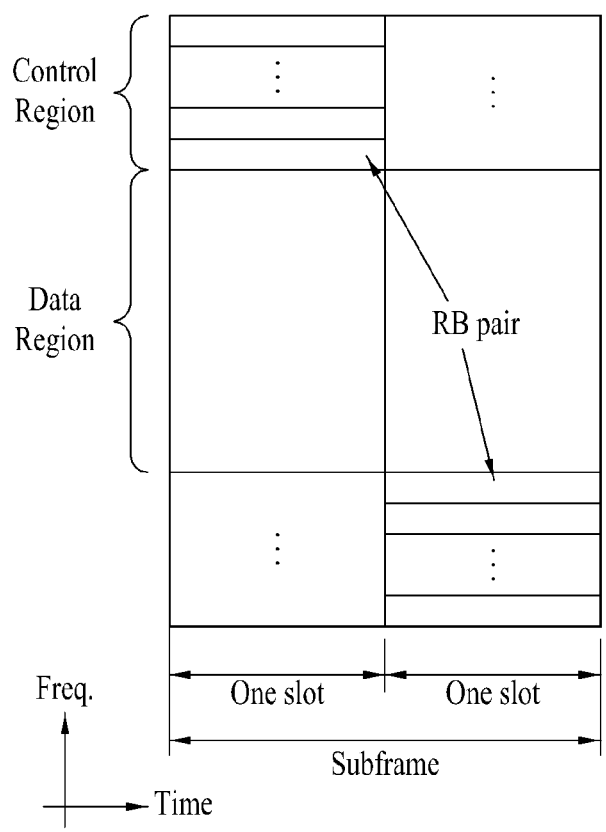
FIG. 5 illustrates an uplink subframe structure.

FIG. 5 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

MIMO System Modeling

FIG. 6 illustrates configurations of wireless communication systems including multiple antennas.

As shown in FIG. 6(a), when the number of transmit (Tx) antennas increases to NT, and at the same time the number of receive (Rx) antennas increases to NR, a theoretical channel transmission capacity of the MIMO communication system increases in proportion to the number of antennas, differently from a case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri).

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 10(a), it is assumed that there are NT Tx antennas and NR Rx antennas. In the case of a transmission signal, a maximum number of transmission information pieces is NT under the condition that NT Tx antennas are used, so that the transmission information can be represented by a specific vector shown in the following equation 2.

$$s = [s_1, s_2, \ldots, s_{N_T}]^T \quad \text{[Equation 2]}$$

Individual transmission information pieces s1, s2, ..., sNT may have different transmission powers. In this case, if the individual transmission powers are denoted by P1, P2, ..., PNT, then transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{S}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{S}$ having an adjusted transmission power is applied to a weight matrix W, so that NT transmission signals x1, x2, ..., xNT to be actually transmitted are configured. In this case, the weight matrix W is adapted to properly distribute transmission information to individual antennas according to transmission channel situations. The above-mentioned transmission signals x1, x2, ..., xNT can be represented by the following equation 5 using the vector X.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

Here, Wij denotes a weight corresponding to i-th Tx antenna and j-th information. W represents a weight matrix or precoding matrix.

When NR Rx antennas are used, received signals y1, y2, ..., yNR of individual antennas can be represented by a specific vector (y) shown in the following equation 6.

$$y = [y_1, y_2, \ldots, y_{N_R}]^T \quad \text{[Equation 6]}$$

When a channel modeling is executed in the MIMO communication system, individual channels can be distinguished from each other according to Tx/Rx antenna indexes. A specific channel passing the range from a Tx antenna j to a Rx antenna i is denoted by hij. In this case, it should be noted that the index order of the channel hij is located before a Rx antenna index and is located after a Tx antenna index.

FIG. 6(b) shows channels from NT Tx antennas to a Rx antenna i. Several channels are tied up, so that they are displayed in the form of a vector or matrix. Referring to FIG. 10(b), the channels passing the range from the NT Tx antennas to the Rx antenna i can be represented by the following equation 7.

$$h_i^T = [h_{i1}, h_{i2}, \ldots, h_{iN_T}] \quad \text{[Equation 7]}$$

If all channels passing the range from the NT Tx antennas to NR Rx antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix H shown in Equation 8. The AWGN n1, n2, ..., nNR added to each of NR Rx antennas can be represented by a specific vector shown in the following equation 9.

$$n = [n_1, n_2, \ldots, n_{N_R}]^T \quad \text{[Equation 9]}$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

A matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \leq \min(N_T, N_R) \quad \text{[Equation 11]}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of information pieces that can be transmitted on a given channel.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

A downlink reference signal defines a common reference signal (CRS) shared by all UEs in a cell and a dedicated reference signal (DRS) dedicated to a specific UE. Information for channel estimation and demodulation can be provided according to these reference signals.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal. An RS related to feedback of channel state information (CSI) such as CQI/PMI/RI may be defined as a CSI-RS.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal (DMRS).

FIG. 7 illustrates a pattern of mapping a CRS and a DRS defined in 3GPP LTE (e.g. release-8) to a downlink resource block (RB) pair. A downlink RB pair as a reference signal mapping unit may be represented as one subframe in the time domain×12 subcarriers in the frequency domain. That is, an RB pair has a length of 14 OFDM symbols in the case of normal CP (FIG. 7(a)) and has a length of 12 OFDM symbols in the case of extended CP (FIG. 7(b)) in the time domain.

FIG. 7 shows RS positions in RB pairs in a system in which an eNB supports 4 transmit antennas. In FIG. 7, REs indicated by '0', '1', '2' and '3' respectively represent CRS positions with respect to antenna port indices 0, 1, 2 and 3. An RE indicated by 'D' represents a DRS position.

CRSs will be described in detail hereinafter.

The CRS is used to estimate a channel of a physical antenna and can be commonly received by all UEs in a cell. The CRS is distributed in the entire band. The CRS can be used for CSI acquisition and data demodulation.

The CRS is defined in various forms according to antenna configuration of a transmitter (eNB). 3GPP LTE (e.g. release-8) supports various antenna configurations and a downlink signal transmitter (eNB) may have three antenna configurations of a single antenna, 2 Tx antennas and 4 Tx antennas. When the eNB performs single antenna transmission, an RS for a single antenna port is provided. When the eNB performs 2-antenna transmission, RSs for 2 antenna ports are provided through time division multiplexing (TDM) and/or frequency division multiplexing (FDM). That is, the R0Ss for the 2 antenna ports can be discriminated from each other by being present in different time resources and/or different frequency resources. Furthermore, when the eNB performs 4-antenna transmission, RSs for 4 antenna ports are provided through TDM/FDM. Channel information estimated by a signal receiver (UE) using the CRS can be used to demodulate data transmitted through single antenna transmission, transmit diversity, closed-loop spatial multiplexing, open-loop spatial multiplexing, multi-user MIMO (MU-MIMO), etc.

In case of multi-antenna transmission, when an RS is transmitted through a specific antenna port, the RS is transmitted in an RE designated according to RS pattern and no signal is transmitted in REs designated for other antenna ports.

A rule of mapping the CRS to an RB conforms to Equation 12.

$$k = 6m + (v + v_{shift}) \bmod 6 \qquad [\text{Equation 12}]$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k is a subcarrier index, l is a symbol index, p is an antenna port index. In addition, $N_{symb}^{DL}$ denotes the number of OFDM symbols of a downlink slot, $N_{RB}^{DL}$ denotes the number of RBs allocated to downlink, $n_s$ is a slot index, $N_{ID}^{cell}$ is a cell ID and mod denotes modulo operation. An RS position in the frequency domain depends on Vshift. Since Vshift depends on cell ID, the RS position has different frequency shift values per cell.

Specifically, to improve channel estimation performance through the CRS, a CRS position in the frequency domain is shifted per cell such that cells have different frequency shift values. For example, when an RS is present for every 3 subcarriers, the RS can be present in a subcarrier 3k in a cell and in a subcarrier 3k+1 in another cell. For an antenna port, an RS is distributed at an interval of 6 REs (i.e. 6 subcarriers) in the frequency domain and spaced apart from REs in which an RS for another antenna port is present in the frequency domain.

Power boosting may be applied to the CRS. Power boosting is a method for transmitting an RS with higher power using power corresponding to REs of an OFDM symbol, other than REs allocated for the RS.

An RS is disposed at a specific interval starting from symbol index (1) 0 of each slot in the time domain. The interval is defined based on CP length. RSs are present in symbols corresponding to symbol indices 0 and 4 in a slot in the case of normal CP and present in symbols corresponding to symbol indices 0 and 3 in the slot in the case of extended CP. Only RSs for up to 2 antenna ports are defined in a single OFDM symbol. Accordingly, in the case of 4-Tx antenna transmission, RSs for antenna ports 0 and 1 are present in symbols corresponding to symbol indices 0 and 4 (symbol indices 0 and 3 in the extended CP case) in a slot and RSs for antenna ports 2 and 3 are present in a symbol corresponding to symbol index 1 in the slot. However, the frequencies of the RSs for antenna ports 2 and 3 are switched in the second slot.

To provide higher spectral efficiency than 3GPP LTE (e.g. release-8), a system (e.g. LTE-A) having an extended antenna configuration may be designed. The extended antenna configuration may be an 8Tx antenna configuration. The system having the extended antenna configuration needs to support UEs operating in a conventional antenna configuration. That is, the system needs to support backward compatibility. Accordingly, it is necessary to support a reference signal pattern according to the conventional antenna configuration and to design a new reference signal pattern for an additional antenna configuration. Here, when a CRS for a new antenna port is added to a system having a conventional antenna configuration, RS overhead abruptly increases, decreasing throughput. In consideration of this, LTE-A evolved from 3GPP LTE introduces an additional RS (CSI-RS) for CSI measurement for a new antenna port.

A DRS will now be described in detail hereinafter.

The DRS (or UE-specific RS) is used for data demodulation. A precoding weight used for a specific UE is used for an RS in multi-antenna transmission such that the UE can estimate an equivalent channel obtained by combining the precoding weight transmitted through each Tx antenna and a transport channel when receiving the RS.

3GPP LTE (e.g. release-8) supports transmission through up to 4 Tx antennas and defines a DRS for rank-1 beamforming. The DRS for rank-1 beamforming is also used as an RS for antenna port index 5. A rule of mapping the DRS to an RB conforms to Equations 13 and 14. Equation 13 relates to the normal CP case and Equation 14 relates to the extended CP case.

$$k = (k')\mathrm{mod}N_{sc}^{RB} + N_{sc}^{RB} \cdot n_{PRB} \qquad \text{[Equation 13]}$$

$$k' = \begin{cases} 4m' + v_{shift} & \text{if } l \in \{2, 3\} \\ 4m' + (2 + v_{shift})\mathrm{mod}4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s\mathrm{mod}2 = 0 \\ 2, 3 & \text{if } n_s\mathrm{mod}2 = 1 \end{cases}$$

$$m' = 0, 1, \ldots, 3N_{RB}^{PDSCH} - 1$$

$$v_{shift} = N_{ID}^{cell}\mathrm{mod}3$$

$$k = (k')\mathrm{mod}N_{sc}^{RB} + N_{sc}^{RB} \cdot n_{PRB} \qquad \text{[Equation 14]}$$

$$k' = \begin{cases} 3m' + v_{shift} & \text{if } l = 4 \\ 3m' + (2 + v_{shift})\mathrm{mod}3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s\mathrm{mod}2 = 0 \\ 1, 2 & \text{if } n_s\mathrm{mod}2 = 1 \end{cases}$$

$$m' = 0, 1, \ldots, 4N_{RB}^{PDSCH} - 1$$

$$v_{shift} = N_{ID}^{cell}\mathrm{mod}3$$

In Equations 13 and 14, k is a subcarrier index, l is a symbol index, p is an antenna port index. In addition, $N_{SC}^{RB}$ denotes an RB size in the frequency domain and is represented by the number of subcarriers, $n_{PRB}$ denotes a PRB number, $N_{RB}^{PDSCH}$ denotes the bandwidth of an RB in which a corresponding PDSCH is transmitted, $n_s$ is a slot index, $N_{ID}^{cell}$ is a cell ID and mod denotes modulo operation. An RS position in the frequency domain depends on Vshift. Since Vshift depends on cell ID, the RS position has different frequency shift values per cell.

LTE-A, the next generation of 3GPP LTE, considers MIMO, multi-cell transmission, enhanced MU-MIMO, etc. of a high order and also considers DRS based data demodulation in order to support efficient RS operation and an improved transmission scheme. That is, a DRS for two or more layers can be defined to support data transmission through an added antenna, separately from the DRS (antenna port index 5) for rank-1 beamforming, defined in 3GPP LTE (e.g. release-8).

Cooperative Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

Sounding Reference Signal (SRS)

An SRS is used for an eNB to measure channel quality and perform uplink frequency-selective scheduling based on the channel quality measurement. The SRS is not associated with data and/or control information transmission. However, the usages of the SRS are not limited thereto. The SRS may also be used for enhanced power control or for supporting various start-up functions of non-scheduled UEs. The start-up functions may include, for example, an initial modulation and coding scheme (MCS), initial power control for data transmission, timing advance, and frequency non-selective scheduling (in which a transmitter selectively allocates a frequency resource to the first slot of a subframe and then pseudo-randomly hops to another frequency resource in the second slot of the subframe).

The SRS may be used for measuring downlink channel quality on the assumption of the reciprocity of a radio channel between the downlink and the uplink. This assumption is valid especially in a time division duplex (TDD) system in which the downlink and the uplink share the same frequency band and are distinguished by time.

A subframe in which a UE within a cell is supposed to transmit an SRS is indicated by cell-specific broadcast signaling. A 4-bit cell-specific parameter 'srsSubframeConfiguration' indicates 15 possible configurations for subframes carrying SRSs in each radio frame. These configurations may provide flexibility with which SRS overhead can be adjusted according to network deployment scenarios. The other one configuration (a 16th configuration) represented by the parameter is perfect switch-off of SRS transmission in a cell, suitable for a cell serving high-speed UEs, for example.

Figure 8:
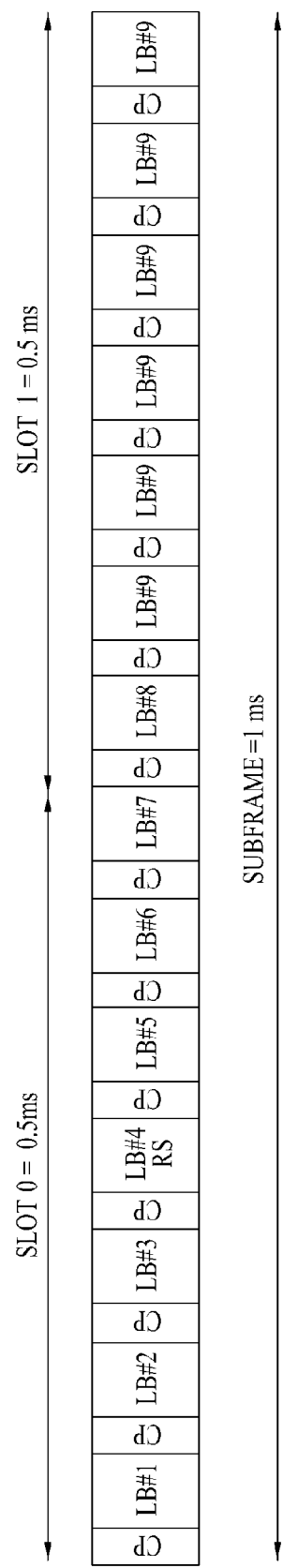
FIG. 8 illustrates an uplink subframe structure including SRS symbols.

As shown in FIG. 8, an SRS is always transmitted in the last SC-FDMA symbol of a configured subframe. Therefore, an SRS and a DMRS are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or Zadoff-Chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Relay

A relay is considered in order to improve the coverage of high data rates, group mobility, temporary network deployment, cell edge throughput and/or to provide coverage in new areas.

The relay forwards transmission and reception between an eNB and a UE, and two links (backhaul link and access link) having different attributes are applied to each carrier frequency band. The eNB may include a donor cell. The relay wirelessly accesses a wireless access network through the donor cell.

A backhaul link between the eNB and the relay may be represented as a backhaul downlink when the backhaul link uses a downlink frequency band or a downlink subframe resource and represented as a backhaul uplink when the backhaul link uses an uplink frequency band or an uplink subframe resource. Here, a frequency band is a resource allocated in frequency division duplex (FDD) mode and a subframe is a resource allocated in time division duplex (TDD) mode. Similarly, an access link between the eNB and the relay may be represented as an access downlink when the access link uses a downlink frequency band or a downlink subframe resource and represented as access uplink when the access link uses an uplink frequency band or an uplink subframe resource.

The eNB needs to have uplink reception and downlink transmission functions and the UE needs to have uplink transmission and downlink reception functions. The relay needs to have functions of backhaul uplink transmission to the eNB, access uplink reception from the UE, backhaul downlink reception from the eNB and access downlink transmission to the UE.

Figure 9:
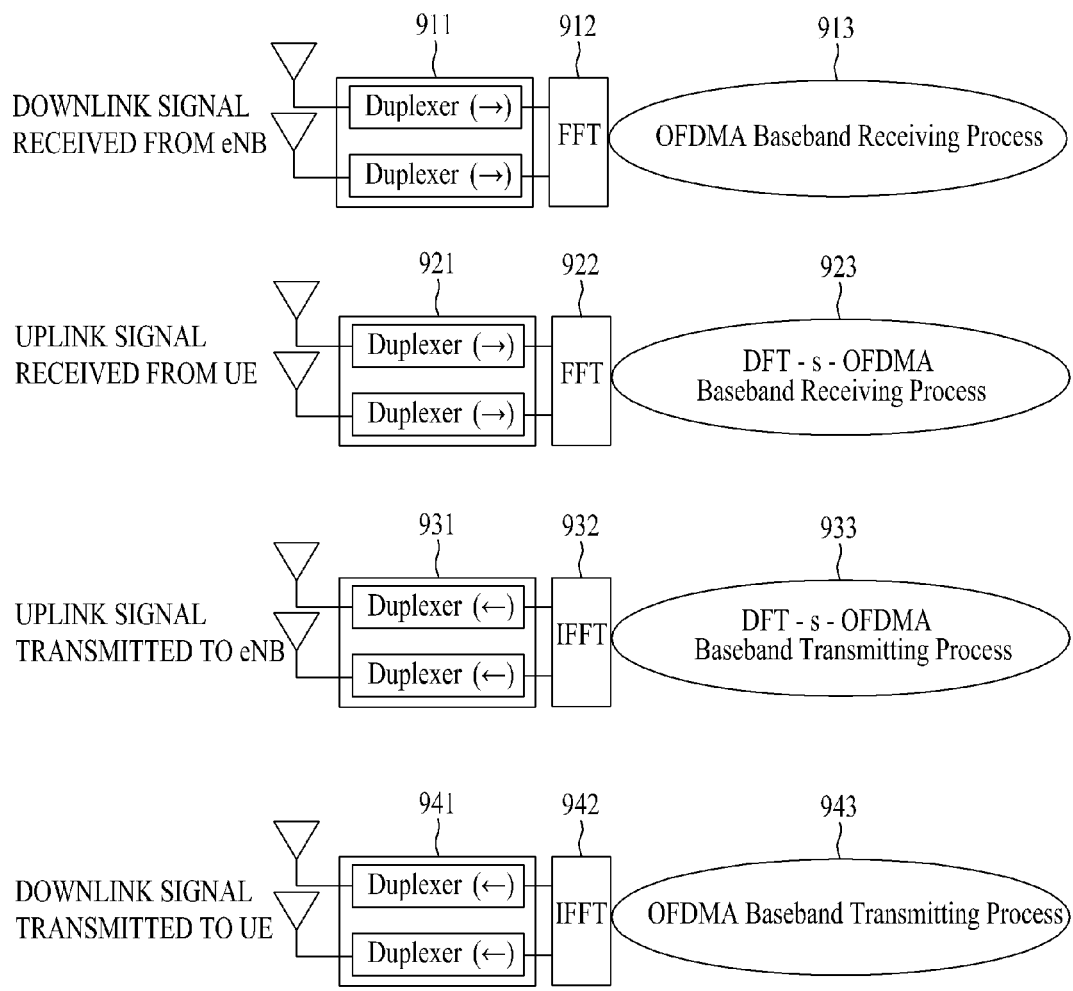
FIG. 9 illustrates examples of implementation of functions of a transmitter and a receiver of an FDD mode relay.

FIG. 9 illustrates examples of implementation of functions of a transmitter and a receiver of an FDD mode relay. A reception function of the relay is descried. A downlink signal received from an eNB is transmitted to a fast Fourier transform (FFT) module 912 via a duplexer 911 and an OFDMA baseband receiving process 913 is performed. An uplink signal received from a UE is delivered to an FFT module 922 via a duplexer 921 and a discrete Fourier transform-spread-OFDMA (DFT-s-OFDMA) baseband receiving process 923 is performed. The process of receiving the downlink signal from the eNB and the process of receiving the uplink signal from the UE may be performed in parallel. A transmission function of the relay is described. An uplink signal transmitted to the eNB is delivered through a DFT-s-OFDMA baseband transmission process 933, an inverse FFT (IFFT) module 932 and a duplexer 931. A downlink signal transmitted to the UE is delivered through an OFDM baseband transmission process 943, an IFFT module 942 and duplexer 941. The process of transmitting the uplink signal to the eNB and the process of transmitting the downlink signal to the UE may be performed in parallel. The duplexers arranged in one direction may be implemented as a single bidirectional duplexer. For example, the duplexer 911 and the duplexer 931 can be implemented as a single bidirectional duplexer and the duplexer 921 and the duplexer 941 can be implemented as a single bidirectional duplexer. A bidirectional duplexer may be implemented such that IFFT module and baseband process module lines related to transmission and reception in a specific carrier frequency band are branched from the bidirectional duplexer.

In relation to the use of a bandwidth (or spectrum) of a relay, the case where a backhaul link operates in the same frequency band as an access link is referred to as in-band, and the case where the backhaul link operates in different frequency bands from the access link is referred to as out-band. In both in-band and out-band, UEs operating according to LTE (e.g., Release-8) should be able to access a donor cell.

The relay may be classified into a transparent relay and a non-transparent relay depending upon whether or not the UE recognizes the relay. In the transparent relay, the UE is not aware that it is communicating with a network via the relay, and in the non-transparent relay, the UE is aware that it is communicating with the network via the relay.

In relation to control of the relay, the relay may be divided into a relay as part of a donor cell and a relay for controlling a cell of its own.

The relay as part of the donor cell may have a relay ID but does not have a cell ID of its own. If at least part of Radio Resource Management (RRM) is controlled by an eNB to which the donor cell belongs (while parts of the RRM may be located in the relay), this may be called a relay as part of the donor cell. Desirably, such a relay may support legacy UEs. Smart repeaters, decode-and-forward relays, different types of L2 (second layer) relays, and Type-2 relays are examples of this type of relay.

In the case where a relay is in control of its own cells, the relay controls one or several cells and a unique physical-layer cell ID is provided to each of the cells controlled by the relay. The same RRM mechanism is available and, in terms of the UE, there is no difference in accessing cells controlled by a relay and cells controlled by a normal eNB. The cells controlled by the relay may support the legacy UEs. Self-backhauling relays, L3 (third layer) relays, type-1 relays, and type-1a relays are examples of this type of relay.

A type-1 relay is an in-band relay and controls a plurality of cells, each of which appears as a separate cell, distinct from the donor cell, to UEs. The plurality of cells has its own physical cell ID (defined in LTE Release-8) and the relay may transmit its own synchronization channels, reference signals, etc. In the context of single-cell operation, the UE may receive scheduling information and HARQ feedback directly from the relay and may transmit its own control channels (SR, CQI, ACK/NACK, etc.) to the relay. The type-1 relay appears as a legacy eNB (an eNB operating according to LTE Release-8) to legacy UEs (UEs operating according to LTE Release-8). Namely, the type-1 relay has backward compatibility. Meanwhile, to UEs operating according to an LTE-A system, the type-1 relay appears as an eNB different from the legacy eNB to allow for performance enhancement.

A type-1a relay has the same characteristics as the above-mentioned type-1 relay except that it operates in out-band. The operation of the type-1a relay may be configured to minimize the influence on the operation of an L1 (first layer) or to eliminate such influence.

A type-2 relay, which is an in-band relay, does not have a separate physical cell ID and thus does not create any new cells. The type-2 relay is transparent to the legacy UEs, and the legacy UEs are not aware of the presence of the type-2 relay. The type-2 relay may transmit a PDSCH but does not transmit a Common Reference Signal (CRS) and a PDCCH.

Meanwhile, in order to allow in-band operation of the relay, some resources in the time-frequency space should be reserved for the backhaul link and may be set not to be used for the access link. This is called resource partitioning.

A general principle for resource partitioning in the relay is as follows. The backhaul downlink and access downlink may be time division multiplexed in a single carrier frequency (namely, only one of the backhaul downlink and access downlink is activated at a specific time). Similarly, the backhaul uplink and access uplink may be time division multiplexed in a single carrier frequency (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes of the eNB and relay and uplink subframes of the eNB and relay, respectively.

In the case of an in-band relay, for example, if reception of the backhaul downlink from the eNB and transmission of the access downlink to the UE are simultaneously performed in a predetermined frequency band, a signal transmitted from a transmitting end of the relay may be received in a receiving end of the relay and thus signal interference or Radio Frequency (RF) jamming may occur at an RF front end of the relay. Similarly, if reception of the access uplink from the UE and transmission of the backhaul uplink to the eNB are simultaneously performed in a predetermined frequency band, signal interference may occur at the RF front end of the relay. Accordingly, in the relay, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installation thereof above/below ground)).

Figure 10:
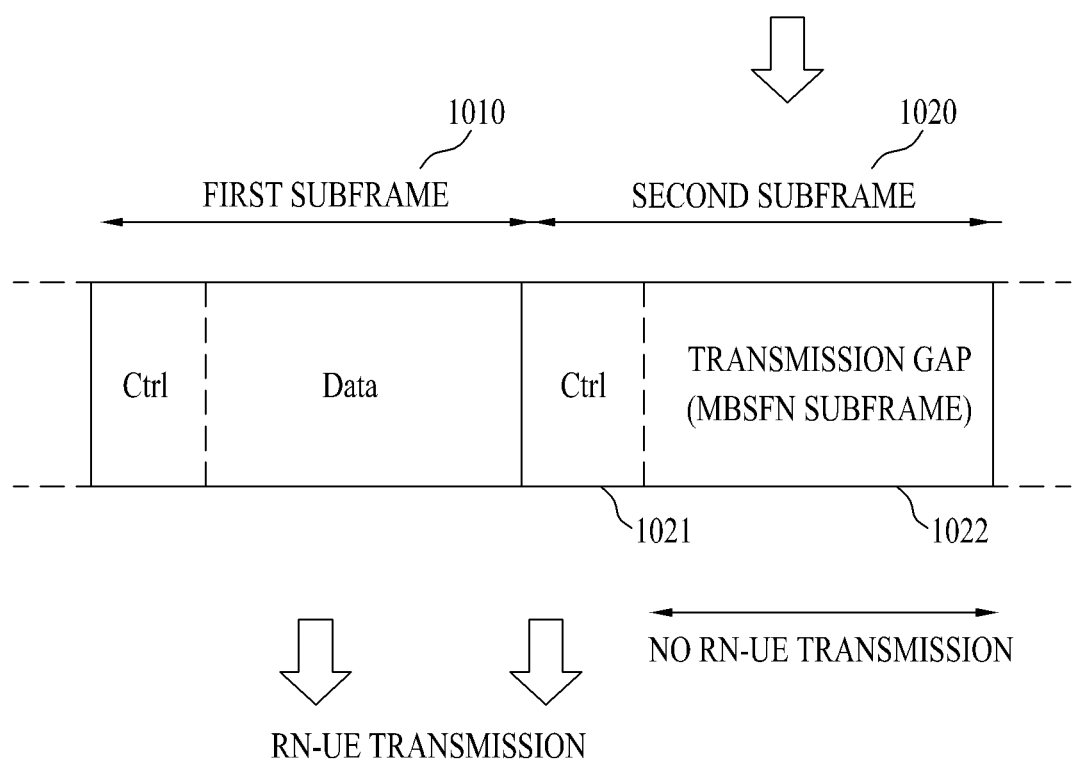
FIG. 10 illustrates transmission from a relay to a UE and downlink transmission from an eNB to a relay.

One method for solving the problem of signal interference is to allow the relay not to transmit a signal to UEs while receiving a signal from the donor cell. That is, a gap may be generated in transmission to the UEs from the relay and the UEs (including the legacy UEs) may be set not to expect any transmission from the relay during the gap. In FIG. 10, a first subframe 1010 is a normal subframe in which a downlink (i.e. access downlink) control signal and data are transmitted from the relay to the UE and a second subframe 1020 is a multicast broadcast single frequency network (MBSFN) subframe. A control signal is transmitted from the relay to the UE in a control region 1021 of the downlink subframe, whereas no signal is transmitted from the relay to the UE in the remaining region 1022 of the downlink subframe. Here, in the case of a legacy UE, since transmission of a physical downlink control channel (PDCCH) is expected in all downlink frames (in other words, the relay needs to support legacy UEs belonging to the coverage thereof such that the legacy UEs receive and measure PDCCHs in every subframe), it is necessary to transmit a PDCCH in all downlink subframes for correct operation of legacy UEs. Accordingly, even in a subframe (second subframe 1020) configured for downlink (i.e. backhaul downlink) transmission from the eNB to the relay, the relay needs to perform access downlink transmission instead of backhaul downlink reception in a period corresponding to first N (N=1, 2 or 3) OFDM symbols of the subframe. For this, since a PDCCH is transmitted from the relay to the UE in the control region 1021 of the second subframe, backward compatibility for legacy UEs served by the relay can be provided. The relay can receive a signal transmitted from the eNB in the remaining region 1022 of the second subframe since no signal is transmitted from the relay to the UE in the region 1022. Accordingly, through such a resource partitioning scheme, access downlink transmission and backhaul downlink reception can be prevented from being simultaneously performed in an in-band relay.

The second subframe 1022 using an MBSFN subframe will be described in detail hereinafter. The MBSFN subframe is a subframe for multimedia broadcast and multicast service (MBMS) for simultaneously transmitting the same signal in multiple cells. The control region 1021 of the second subframe may be regarded as a relay non-listening interval. The relay non-listening interval refers to a period in which a relay transmits an access downlink signal instead of receiving a backhaul downlink signal. The relay non-listening interval can be set to a length of 1, 2 or 3 OFDM symbols, as described above. The relay can perform access downlink transmission to the UE in the relay non-listening interval 1021 and receive a backhaul downlink signal from the eNB in the remaining region 1022. Here, since the relay cannot simultaneously perform transmission and reception in the same frequency band, time is taken for the relay to switch from transmission mode to reception mode. Accordingly, a guard time GT needs to be set to the first part of the backhaul downlink reception region 1022 such that the relay can perform transmission/reception mode switching in the region 1022. Similarly, even when the relay receives a backhaul downlink signal from the eNB and transmits an access downlink signal to the UE, a guard time (GT) for reception/transmission mode switching of the relay can be set. The duration of the GT may be set to a value in the time domain. For example, the duration of the GT can be set to k (k=1) time sample (Ts) or one or more OFDM symbols. A GT of the last part of the subframe may not be defined or set when relay backhaul downlink subframes are continuously configured or according to a predetermined subframe timing alignment relationship. This GT may be defined only in a frequency region set for backhaul downlink subframe transmission in order to maintain backward compatibility (legacy UEs cannot be supported when a GT is set in an access downlink period). The relay can receive a PDCCH and a PDSCH from the eNB in the backhaul downlink reception period 1022 other than the GT. Particularly, a PDCCH for the relay can be represented as a relay-PDCCH (R-PDCCH) in the sense of a relay dedicated physical channel.

Inter-Cell Interference Coordination (ICIC)

When coverages of two eNBs eNB1 and eNB2 overlap since the two eNBs are located adjacent to each other, a strong downlink signal from one eNB may cause interference for a UE served by the other eNB. For example, in FIG. 1, interference may be generated in the UE 130 served by the micro eNB 120 by a signal from the macro eNB 110. When inter-cell interference is generated, the two eNBs may reduce inter-cell interference through inter-cell cooperation.

It is assumed that signal transmission and reception are smoothly performed between two eNBs which interfere each other in the following embodiments of the present invention. For example, it is assumed that a wired/wireless link (e.g. backhaul link or Un interface) having satisfactory transmission conditions such as transmission bandwidth, time delay, etc. is present between the two eNBs and thus reliability of transmission and reception of a cooperative signal between the two eNBs is high. In addition, it is assumed that time synchronization between the two eNBs is within an allowable error range (when boundaries of downlink subframes of the two eNBs which interfere each other are aligned, for example) or the eNBs clearly recognize an offset between the subframe boundaries of the eNBs.

Referring back to FIG. 1, eNB1 110 may be a macro eNB that covers a wide area with high Tx power and eNB2 120 may be a micro eNB that covers a narrow area with low Tx power. As shown in FIG. 1, when eNB2 120 is located at a cell edge and strong interference from eNB1 110 is applied to the UE 130 served by eNB2 120, effective communication may not be performed without appropriate inter-cell cooperation.

Particularly, when a large number of UEs are connected to micro eNB2 120 having low power to distribute loads on which macro eNB1 110 provides services, the possibility that the aforementioned inter-cell interference occurs is high.

For example, when a UE selects a serving eNB, the UE can calculate and compare Rx powers of downlink signals from a micro eNB and a macro eNB by adding a predetermined adjustment value (bias value) to the Rx power of the micro eNB and adding no adjustment value to the Rx power of the macro eNB. Consequently, the UE can select an eNB that provides highest downlink Rx power as the serving eNB. Accordingly, a larger number of UEs can be connected to the micro eNB.

The micro eNB can be selected as the serving eNB even though the intensity of the downlink signal received by the UE from the macro eNB is much higher than the downlink signal from the micro eNB, and strong interference from the macro eNB may be applied to UEs connected to the micro eNB. In this case, UEs located at the boundary of the micro eNB may not perform correct operations due to strong interference from the macro eNB if inter-cell cooperation is not provided.

The aforementioned inter-cell interference generation situation is exemplary and embodiments of the present invention are equally applicable to different inter-cell interference generation situations (e.g. a case in which inter-cell interference occurs between a CSG type HeNB and an OSG type macro eNB, a case in which a micro eNB causes interference and a macro eNB is interfered by the micro eNB or a case in which inter-cell interference occurs between micro eNBs or between macro eNBs).

The following description is based on the assumption that an interfering cell is eNB1, an interfered cell is eNB2, eNB1 is a macro eNB and eNB2 is a micro eNB. However, the present invention is not limited thereto and the principle of the present invention is applicable to various inter-cell interference cases.

To perform effective operations even when inter-cell interference is present between two eNBs, appropriate cooperation between the two eNBs needs to be achieved and a signal that enables cooperation can be transmitted/received through a link (e.g. X2 interface) between the two eNBs. For example, when inter-cell interference is generated between a macro eNB and a micro eNB, the macro eNB may control inter-cell cooperation and the micro eNB may perform an appropriate operation according to a cooperative signal signaled by the macro eNB. In addition, an eNB may provide signaling (e.g. OTA (over the air) signaling) related to inter-cell interference coordination to a UE affected by inter-cell interference independently or simultaneously with inter-cell interference coordination operation.

Inter-cell interference coordination may be performed in frequency resources and/or time resources. In one embodiment of an inter-cell interference coordination scheme, eNB1 may not perform transmission (i.e. transmit a null signal or perform silencing) in a specific resource region or reduce Tx power for a UE connected to eNB2. Here, the specific resource region in which silencing is performed may be represented as a time resource and/or a frequency resource.

For example, the position of a silenced time resource may be determined by a combination of at least one of the entire time region, a specific subframe, a specific slot and a specific OFDM symbol. In addition, the position of a silenced frequency resource may be determined by a combination of at least one of the entire frequency band, a specific carrier (in case of carrier aggregation using a plurality of carriers), a specific resource block and a specific subcarrier. Accordingly, a resource region in which silencing is performed can be correctly specified.

Cell range extension (CRE) of the micro cell can be achieved according to silencing or Tx power reduction of the macro cell. For example, the macro cell can de-boost Tx power by a maximum of 9 dB in a specific resource region or transmit no signal to reduce interference applied to the micro cell in the specific resource region and extend the range that can be served by the micro cell.

A description will be given of a detailed inter-cell interference coordination scheme.

Inter-cell Interference Coordination in Time Domain

Inter-cell interference coordination with respect to a time resource will now be described. For example, inter-cell interference coordination with respect to a time resource in a 3GPP LTE (release-10) wireless communication system can be performed in such a manner that the time resource is segmented into a plurality of subframes and information representing whether silencing or transmission with reduced Tx power is performed for each subframe is indicated. That is, inter-cell interference coordination with respect to the time resource refers to cooperation between the interfering cell (eNB1) and the interfered cell (eNB2) with respect to how the subframes will be used. Here, information on silencing or Tx power information for each subframe may be exchanged between the interfering cell and the interfered cell through X2 signaling, backhaul signaling or OAM (operations administration and maintenance). A subframe to which silencing is applied may be referred to as an almost blank subframe (ABS).

For example, eNB1 can set a specific subframe (or subframe set) to an ABS such that strong interference from eNB1 is not applied to eNB2 in the specific subframe. That is, downlink Tx power, traffic or activity of eNB1 is reduced or no signal is transmitted (i.e. a null signal is transmitted) in the specific subframe (or subframe set).

Specifically, an ABS may refer to a subframe in which only a CRS is transmitted in a control region and a data region and other control information and data are not transmitted. However, important downlink channels and downlink signals, such as PBCH (physical broadcast channel), PSS (primary synchronization signal), SSS (secondary synchronization signal), etc., may be transmitted in the ABS. In addition, a CRS of the data region may not be transmitted in the ABS.

When eNB1 sets the ABS, information related to the ABS may be exchanged through a link (e.g. X2 interface) between eNB1 and eNB2. For example, an ABS information element (IE) and/or an ABS status IE defined in 3GPP LTE standard document (e.g. TS 36.423) can be used.

TABLE 1

| IE/Group Name | Presence | Range | IE type and reference | Semantics description |
|---|---|---|---|---|
| CHOICE ABS Information | M | — | — | — |
| >FDD | | | — | — |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . . ) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1-5; 60 for UL/DL subframe configuration 6; 70 for UL/DL subframe configuration 0. UL/DL subframe configuration defined in TS 36.211 [10]. The first position of the ABS pattern corresponds to subframe 0 in a radio frame where SFN = 0. The ABS pattern is |

TABLE 1-continued

| IE/Group Name | Presence | Range | IE type and reference | Semantics description |
|---|---|---|---|---|
| | | | | continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

Table 1 shows an ABS IE transmitted from eNB1 that sets the ABS to eNB2. The ABS IE may include ABS pattern information in TDD and FDD, information on the number of cell-specific antenna ports for CRS, measurement subset information, etc.

Specifically, the ABS pattern information indicates a subframe to be used as an ABS and is composed of a 40-bit bitmap in case of FDD and composed of a maximum of a 70-bit bitmap according to downlink/uplink subframe configuration in case of TDD.

For example, in case of FDD, 40 bits indicate 40 subframes, a bit value "1" indicates an ABS and a bit value "0" indicates a non-ABS.

The information on the number of cell-specific antenna ports is used for CRS measurement such that a served UE can perform restricted measurement only in the ABS.

The measurement subset information is a subset of the ABS pattern information and is composed of a 40-bit bitmap in case of FDD and composed of a maximum of 70-bit bitmap in case of TDD. A measurement subset refers to a restricted measurement set recommended by eNB1 to set restricted measurement in the UE served by eNB2. A subframe set to the measurement subset may be regarded as a subframe that is more statically set to an ABS from among subframes set to ABSs.

TABLE 2

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB$_2$ for UEs needing protection by ABS from inter-cell interference for DL scheduling, or allocated by the eNB$_2$ for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | | |
| >>Usable ABS Pattern Info | M | | BIT STRING (SIZE(40)) | Each position in the bitmap represents a subframe, for which value "1" indicates 'ABS that has been designated as protected from inter-cell interference by the eNB$_1$, and available to serve this purpose for DL scheduling in the eNB$_2$' and value "0" is used for all other subframes. The pattern represented by the bitmap is a subset of, or the same as, the corresponding ABS Pattern Info IE conveyed in the LOAD INFORMATION message from the eNB$_1$. |

TABLE 2-continued

| IE/Group Name | Presence | Range | IE type and reference | Semantics description |
|---|---|---|---|---|
| >TDD | — | | — | — |
| >>Usable ABS Pattern Info | M | | BIT STRING (1 ... 70) | Each position in the bitmap represents a subframe, for which value "1" indicates 'ABS that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding ABS Pattern Info IE conveyed in the LOAD INFORMATION message from the $eNB_1$. |

Table 2 shows the ABS status IE. The ABS status IE may be transmitted from eNB2 to eNB1 and signals whether eNB1 needs to correct the ABS pattern. The ABS status IE may include usable ABS pattern information and downlink (DL) ABS status information.

The usable ABS pattern information is bitmap information indicating whether a subframe set to an ABS has been correctly used for interference mitigation and corresponds to a subset of the ABS pattern IE included in a load information message and transmitted from the interfering cell (eNB1). Specifically, each position in the bitmap represents a subframe, bitmap information corresponding to a subframe set to "1" indicates an ABS that has been designated as protected from inter-cell interference by eNB1, and eNB2 mitigates inter-cell interference by performing downlink scheduling in the subframe set to "1".

The DL ABS status information indicates the percentage of used ABS resources. Specifically, the DL ABS status information refers to the percentage of resource blocks allocated by the interfered cell (eNB2) for UEs that need protection from inter-cell interference from among the total number of downlink resource blocks (RBs) in the ABS indicated by the usable ABS pattern information. That is, the DL ABS status information represents whether eNB2 efficiently uses the ABS for the purpose of interference elimination.

Inter-cell Interference Coordination in Frequency Domain

A description will be given of inter-cell interference coordination with respect to frequency resources. For example, inter-cell interference coordination with respect to a frequency resource in a 3GPP LTE (release-8) wireless communication system can be performed by dividing the frequency resource into specific resource (e.g. physical resource block (PRB) or subband) units and transmitting/receiving information on the specific resource units through the link between the two eNBs. Specifically, information on the specific resource units may include relative narrowband transmission power (RNTP), interference overload indication (IOI), high interference indication (HII), etc.

Here, the RNTP refers to information representing downlink Tx power that the interfering cell (eNB1) uses in a specific resource (e.g. PRB or subband). The RNTP may be determined using a bitmap in the specific resource unit and determined bitmap information may be transmitted to an interfered cell (eNB2) through the link between the eNBs. For example, RNTP set to "0" in the specific resource unit represents that downlink Tx power does not exceed a defined threshold value and RNTP set to "1" represents that it is impossible to ensure whether the downlink Tx power does not exceed the defined threshold value.

The IOI refers to information indicating the quantity of uplink interference in the specific resource unit, which is caused by the interfering cell (eNB1). That is, the IOI is information indicating a specific resource which is severely interfered. For example, when the IOI represents severe interference in a specific resource, the IOI indicates presence of severe uplink interference in the specific resource. In this case, the interfered cell (eNB2) can mitigate interference present between eNB1 and eNB2 by scheduling a UE using low uplink Tx power from among UEs served thereby in the specific resource.

The HII indicates the sensitivity of uplink interference from the interfering cell (eNB1) with respect to a specific resource. For example, when the HII is set to '1' in the specific resource, the HII represents that there is a possibility that eNB1 schedules a UE having high uplink Tx power (i.e. causing storing inter-cell interference) in the specific resource. When the HII is set to '0' in the specific resource, the HII represents that there is a possibility that eNB1 schedules a UE having low uplink Tx power in the specific resource. In this case, the interfered cell (eNB2) may use a specific resource to which interference is less applied for which the HII is set to '0', to schedule UEs served thereby and schedule UEs that can operate even in case of serous interference in a specific resource to which strong interference is applied, for which the HII is set to '1', thereby mitigating inter-cell interference.

Improved Downlink ICIC

The conventional ABS is used to transmit only primary channels or signals (e.g. CRS, PSS, SSS, PBCH and minimum control channel).

In an improved ICIC scheme, ABSs of two types can be defined. A first type ABS corresponds to a zero power-almost blank subframe (z-ABS) in which data (or a PDSCH signal) is not transmitted in a data region like the conventional ABS. A second type ABS corresponds to a reduced power-almost blank subframe (r-ABS) in which data (or a PDSCH signal) is transmitted with reduced power in a data region. The r-ABS may be referred to as a non-zero power-ABS.

When the r-ABS is used, a UE served by an interfering cell (e.g. eNB1) can receive data even through an ABS and thus system throughput can be improved. That is, it is possible to enable eNB1 to perform downlink transmission while reducing interference applied to an interfered cell (e.g. eNB2) by decreasing Tx power of eNB1. To achieve this, information on an ABS pattern set by eNB1 and/or Tx power applied to the ABS may be provided to eNB2 through X2 signaling.

The ABS pattern information may be configuration information about a subframe corresponding to the z-ABS, a subframe corresponding to the r-ABS and a normal subframe (i.e. non-ABS). In addition, the information on the Tx power applied to the ABS may include at least one of downlink data Tx power (e.g. 0) of eNB1 in a z-ABS, downlink data Tx power (e.g. $P_{r-ABS}$) of eNB1 in an r-ABS and downlink data Tx power (e.g. $P_{normal}$) of eNB1 in a normal subframe.

Embodiment 1

The present embodiment relates to a method for correctly interpreting an uplink frequency domain ICIC message when the r-ABS is configured.

Interpretation of the uplink frequency domain ICIC message (e.g. HII or IOI) transmitted from an interfering cell (e.g. eNB1) to an interfered cell (e.g. eNB2) needs to depend on whether an ABS set by eNB1 is a z-ABS or an r-ABS.

When uplink scheduling information (or a UL grant) is received through a downlink control channel (e.g. PDCCH) in a subframe n, uplink transmission according to the UL grant is performed in a subframe n+k. When downlink data is received through a downlink data channel (e.g. PDSCH) in the subframe n, ACK/NACK information that indicates whether the downlink data has been successfully received can be transmitted through an uplink channel (e.g. PUCCH or PUSCH) in the subframe n+k. The aforementioned uplink subframe (i.e. subframe n+k (k=4 in an FDD system, for example)) may be represented as a subframe related to the downlink subframe (i.e. subframe n).

For example, when the downlink subframe is set to a z-ABS, the uplink subframe related to the downlink subframe can be indirectly or implicitly interpreted as a z-ABS. Specifically, when the subframe n is a z-ABS, it can be expected that uplink transmission or ACK/NACK transmission is not performed in the subframe n+k since uplink scheduling information or downlink data is not received in the subframe n.

The frequency domain ICIC message is applied to a specific frequency resource and is not information applied to a specific subframe. In other words, the frequency domain ICIC message is applied to all normal subframes. However, it can be considered that the conventional uplink frequency domain ICIC message (e.g. HII and IOI) is not valid in an uplink subframe related to a downlink subframe corresponding to a z-ABS.

Accordingly, the present invention proposes a scheme in which a neighboring cell (i.e. eNB2) interprets HII and IOI transmitted from eNB1 to eNB2 as an invalid message in an uplink subframe related to a downlink subframe when eNB1 sets the downlink subframe to a z-ABS since uplink transmission from a UE belonging to eNB1 is not performed in the uplink subframe related to the downlink subframe.

In addition, the present invention additionally proposes an uplink frequency domain ICIC message interpretation method for an uplink subframe when the r-ABS is configured. The aforementioned method of uniformly interpreting the uplink frequency domain ICIC message according to whether an uplink subframe is an ABS or a normal subframe cannot be applied to a case in which the r-ABS is configured.

Since uplink scheduling information or downlink data can be transmitted in the r-ABS, uplink transmission or ACK/NACK information transmission can be performed in an uplink subframe related to the r-ABS. Accordingly, when the subframe n is set to the r-ABS, the subframe n+k related to the subframe n cannot be regarded as a z-ABS. Furthermore, while downlink transmission in the r-ABS is defined as being performed with reduced Tx power, uplink transmission is not necessarily performed with reduced Tx power in the uplink subframe related to the r-ABS. Accordingly, even when the subframe n is set to the r-ABS, the subframe n+k related to the subframe n cannot be regarded as the r-ABS. Rather, when the subframe n is set to the r-ABS, it is appropriate to consider that eNB1 has intention of performing downlink transmission in the subframe n and normal uplink transmission is performed in the uplink subframe related to the subframe n. Accordingly, when the subframe n is set to the r-ABS, the subframe n+k related to the subframe n can be regarded as a normal subframe.

The z-ABS refers to a subframe in which an eNB has no intention of scheduling downlink unicast data. The eNB also has no intention of scheduling uplink unicast data in an uplink subframe related to the z-ABS. The r-ABS refers to a subframe in which the eNB has intention of scheduling downlink unicast data with reduced Tx power. The eNB has intention of scheduling uplink unicast data in an uplink subframe related to the r-ABS.

Accordingly, the method of interpreting the uplink frequency domain ICIC message (e.g. HII and/or IOI) transmitted from eNB1 to eNB2 on the basis of ABS pattern information (e.g. information for identifying the z-ABS, r-ABS or normal subframe) set by eNB1 can be arranged as follows.

When eNB1 sets a downlink subframe to a z-ABS, eNB2 can assume an uplink subframe related to the downlink subframe as a z-ABS. In this case, eNB2 can interpret the uplink frequency domain ICIC message (e.g. HII and IOI) transmitted from eNB1 as being invalid in the uplink subframe or as having a low threshold.

When eNB1 sets a downlink subframe to an r-ABS, eNB2 can assume an uplink subframe related to the downlink subframe as a normal subframe. In this case, eNB2 can interpret the downlink frequency domain ICIC message (e.g. HII and IOI) transmitted from eNB1 as being valid in the uplink subframe.

Embodiment 2

The present embodiment relates to an uplink ABS pattern signaling method. In the present embodiment, an uplink ABS pattern refers to a subframe pattern to which reduced (including 0) uplink Tx power is applied.

According to the conventional scheme, ABS pattern information is provided to a neighboring cell without discriminating the z-ABS from the r-ABS (refer to Table 1). The conventional ABS pattern relates to a downlink ABS pattern. In addition, since Tx power of 0 is assumed in a downlink ABS, information on Tx power in the downlink ABS is not signaled to the neighboring cell. According to the aforementioned improved ICIC scheme, interference characteristics in an uplink subframe depends on a downlink ABS configuration of an interfering cell (e.g. eNB1), and thus eNB1 can signal, to an interfered cell (e.g. eNB2), Tx power information in the z-ABS/r-ABS thereof and downlink z-ABS/r-ABS pattern information.

In the present embodiment, eNB1 does not signal Tx power information in the ABS to eNB2 (e.g. as shown in Table 1) while using both the z-ABS and r-ABS and signals only an ABS pattern to eNB2 without discriminating the z-ABS from the r-ABS to enable eNB2 to discriminate the z-ABS of eNB1 from the r-ABS of eNB1. That is, the downlink ABS pattern refers to a subframe pattern to which reduced (including 0) downlink Tx power is applied.

According to the present embodiment, eNB1 can additionally signal an uplink ABS pattern thereof to eNB2. As described above, an uplink subframe related to a downlink z-ABS may correspond to a z-ABS and an uplink subframe related to a downlink r-ABS may correspond to a normal subframe.

That is, since whether an uplink subframe related to each ABS in the downlink ABS pattern corresponds to an ABS depends on Tx power in the downlink ABS, it is possible to determine whether the downlink ABS is an r-ABS or a z-ABS through the uplink ABS pattern. For example, when the downlink ABS is a z-ABS, the uplink subframe related to the downlink ABS can be regarded as an uplink ABS since uplink data transmission is barely performed in the uplink subframe. When the downlink ABS is an r-ABS, the uplink subframe related to the downlink ABS cannot be determined as an ABS and may be regarded as a normal subframe.

In other words, when an uplink subframe related to a subframe indicated as an ABS in the downlink ABS pattern of eNB1 is indicated as an ABS in the uplink ABS pattern of eNB1, eNB2 can consider the downlink ABS of eNB1 as a z-ABS. When an uplink subframe related to a subframe indicated as an ABS in the downlink ABS pattern of eNB1 is indicated as a normal subframe in the uplink ABS pattern of eNB1, eNB2 can consider the downlink ABS of eNB1 as an r-ABS. That is, eNB2 can detect whether an ABS of eNB1 is a z-ABS or an r-ABS in consideration of the downlink ABS pattern and the uplink ABS pattern of eNB1 simultaneously.

Figure 11:
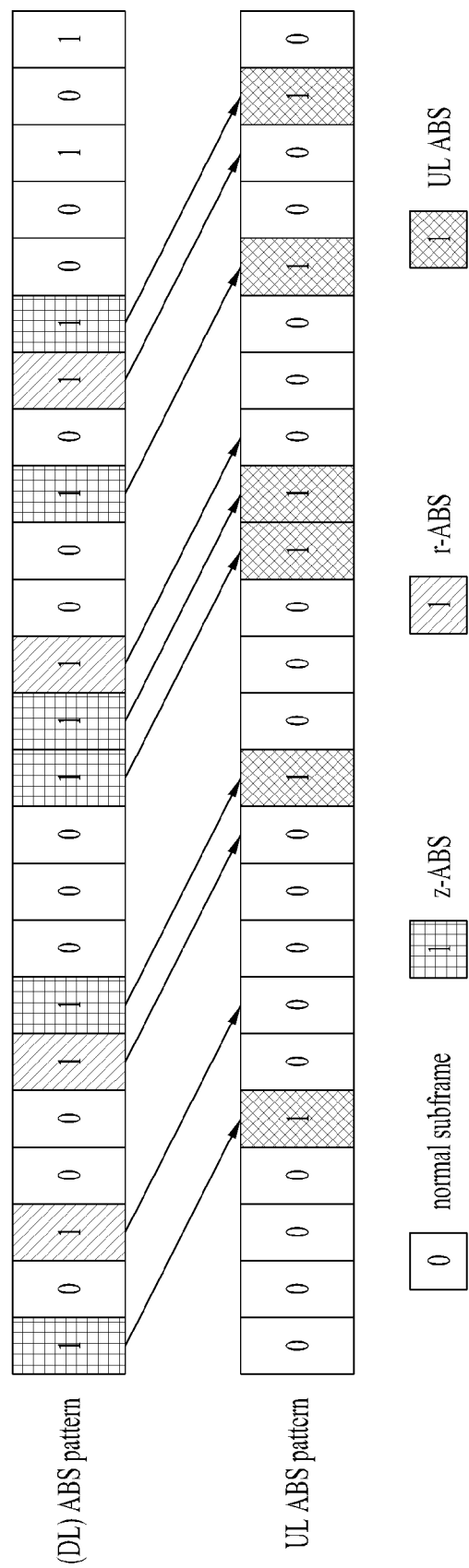
FIG. 11 illustrates the relationship between a downlink (DL) ABS pattern and an uplink (UL) ABS pattern.

FIG. 11 illustrates the relationship between a downlink (DL) ABS pattern and an uplink (UL) ABS pattern. FIG. 11 shows a case in which k=4 in the uplink subframe n+k related to the downlink subframe n. eNB2 can infer which DL ABS of eNB1 is a z-ABS or an r-ABS through the DL ABS pattern and UL ABS pattern provided by eNB1. That is, when the DL ABS pattern of eNB1 includes a subframe set to an ABS, eNB2 can infer that the corresponding subframe is a z-ABS when a UL subframe related to the corresponding subframe is set to an ABS in the UL ABS pattern of eNB1 and infer that the corresponding subframe is an r-ABS when the UL subframe is not set to an ABS in the UL ABS pattern of eNB1.

The present invention proposes a scheme in which eNB2 additionally signals information on UL ABS status to eNB1 when eNB1 signals the UL ABS pattern to eNB2, as described above. In addition, the present invention proposes a scheme in which eNB2 additionally signals information about usable UL ABS Pattern Info to eNB1. The information about the UL ABS status and/or Usable UL ABS Pattern Info may be included in the ABS status IE of Table 2.

Usable UL ABS Pattern Info is defined as a subset of UL ABS Pattern Info and may have a bitmap form. Usable UL ABS Pattern Info may indicate whether a subframe set to a UL ABS has been correctly used for interference mitigation. UL ABS status is defined as the ratio of the number of UL resource blocks scheduled in the subframe indicated by Usable UL ABS Pattern Info to the number of resource blocks allocated to a UE that needs to be protected through a UL ABS from among the scheduled UL resource blocks and indicates how efficiently an interfered cell (e.g. eNB2) uses the UL ABS for interference cancellation. For example, an interfering cell (e.g. eNB1) can determine how many UL ABSs will be increased on the basis of UL ABS status. eNB1 can increase the number of UL ABSs by increasing the number of subframes set to the z-ABS from among DL ABSs.

Figure 12:
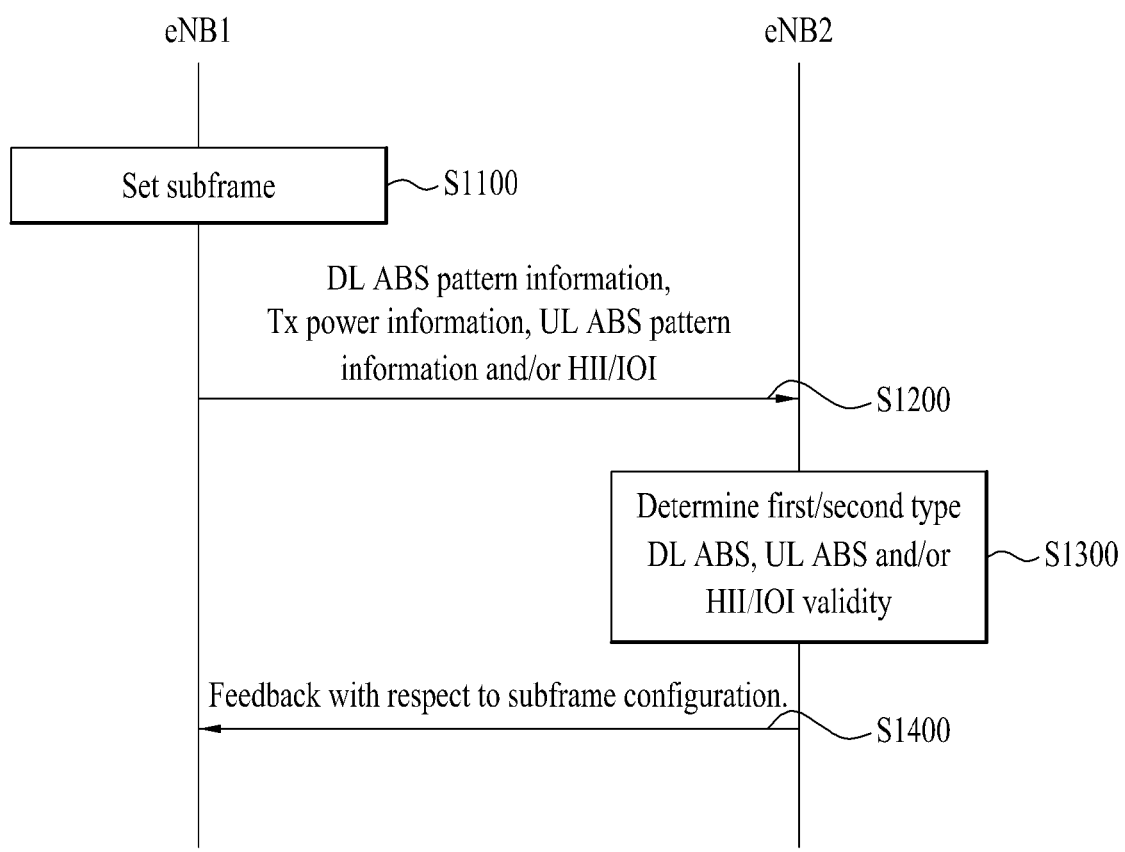
FIG. 12 is a flowchart illustrating a method for transmitting and receiving subframe pattern information between eNBs.

FIG. 12 is a flowchart illustrating a method for transmitting and receiving subframe pattern information between eNBs according to an embodiment of the present invention. In the example of FIG. 12, information exchange between eNB1 and eNB2 may be performed through X2 signaling.

In step S1100, eNB1 may perform subframe configuration. Specifically, eNB1 may determine the first type ABS, the second type ABS and the normal subframe from among downlink subframes. The first type ABS may correspond to the z-ABS, the second type ABS may correspond to the r-ABS and the normal subframe may correspond to a subframe other than the first and second type ABSs.

In step S1200, eNB1 may transmit, to eNB2, at least one of DL ABS pattern information, UL ABS pattern information and an uplink frequency domain ICIC message (e.g. HII and/or IOI). Here, the DL ABS pattern information may be provided as i) a pattern that discriminates the z-ABS from the r-ABS or ii) a pattern that indicates a DL ABS without discriminating the z-ABS from the r-ABS. In the case of i), the UL ABS pattern information can be omitted and eNB1 Tx power information on the z-ABS and r-ABS may be additionally transmitted.

In step S1300, eNB2 may identify or assume the z-ABS and r-ABS from among DL ABSs on the basis of the DL ABS pattern information and the UL ABS pattern information of eNB1. If the DL ABS pattern is provided as the pattern that discriminates the z-ABS from the r-ABS, then the UL ABS pattern information may be omitted. In this case, eNB2 may identify or assume a UL ABS pattern on the basis of a z-ABS pattern and an r-ABS pattern. In addition, eNB2 may determine whether HII/IOI of eNB1 is valid in a UL subframe. When explicit pattern information on a UL ABS is not provided, HII/IOI validity may be determined according to embodiment 1. When the explicit pattern information on the UL ABS is provided, it may be determined that HII/IOI is not valid in the UL ABS and is valid in other subframes.

In step S140, eNB2 may transmit feedback with respect to ABS configuration to eNB1 on the basis of a measurement result reported by a UE belonging to UE2. Feedback transmission may be performed using the aforementioned ABS Status IE and may include at least one of ABS status for the DL z-ABS of eNB1, ABS status for the DL r-ABS of eNB1 and ABS status for the UL ABS of eNB1.

The aforementioned various embodiments of the present invention are applicable to information exchange between the eNBs described with reference to FIG. 12 and description of redundant parts is omitted. Furthermore, the above-described various embodiments of the present invention are independently applicable or two or more thereof are simultaneously applicable.

While configuration of the z-ABS and r-ABS is exemplified in the above description for clarity, the principle of the present invention can be equally applied to a new transmission resource setting scheme to which the conventional Tx power allocation is not applied. That is, the scope of the present invention is not limited to the aforementioned embodiments of z-ABS and r-ABS configuration and can include a method for exchanging information on a new transmission resource pattern to which different Tx power levels are applied.

Figure 13:
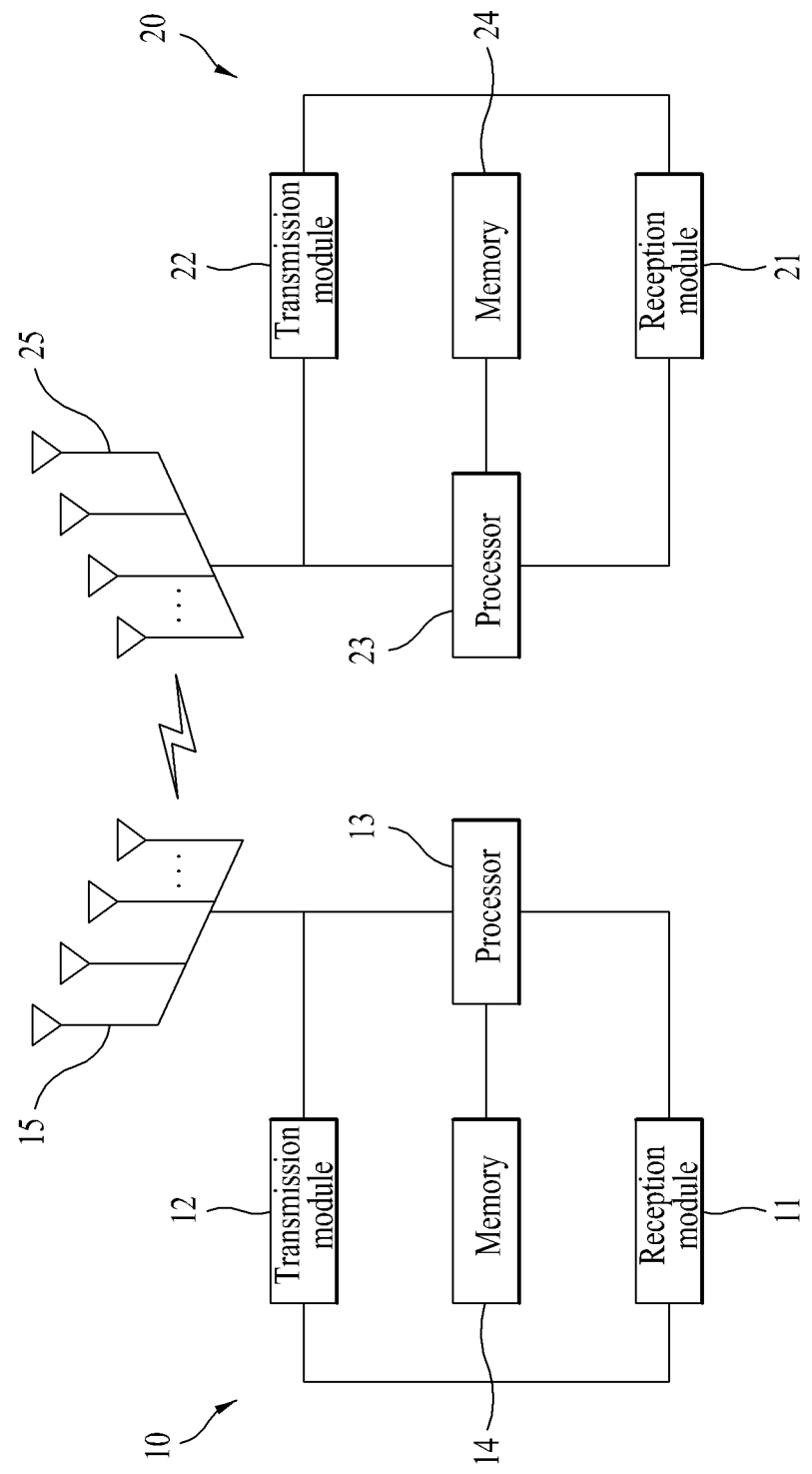
FIG. 13 illustrates a configuration of an eNB according to an embodiment of the present invention.

FIG. 13 illustrates a configuration of an eNB according to an embodiment of the present invention.

Referring to FIG. 13, an eNB 10 may include a reception module 11, a transmission module 12, a processor 13, a memory 14 and a plurality of antennas 15. The plurality of antennas refers to an eNB supporting MIMO transmission/reception. The reception module 11 may receive signals, data and information from an external device and the transmission module 12 may transmit signals, data and information to the external device. The processor 13 may control overall operation of the eNB10.

The eNB 10 according to an embodiment of the present invention may be an eNB of a second cell, which receives subframe pattern information of a first cell. The processor 13 of the eNB 10 may be configured to receive downlink ABS pattern information and uplink ABS pattern information of the first cell through the reception module 11. The downlink ABS pattern information does not discriminate first and second type ABSs set by the first cell from each other, and first and second type ABS patterns of the first cell may be identified on the basis of the downlink ABS pattern information and the uplink ABS pattern information.

The eNB 10 according to another embodiment of the present invention may be an eNB of the second cell, which receives subframe pattern information of the first cell. The processor 13 of the eNB 10 may be configured to receive downlink ABS pattern information of the first cell and Tx power information on a downlink ABS through the reception module 11. The downlink ABS pattern information discriminates the first and second type ABSs set by the first cell from each other, and an uplink ABS pattern of the first cell may be identified on the basis of the first and second type ABSs.

The processor 13 of the eNB 10 may process information received by the eNB 10, information transmitted from the eNB 10 to the outside, etc. The memory 14 may store processed information for a predetermined time and may be replaced by a component such as a buffer (not shown).

In the aforementioned configurations of the eNB and the UE, the above-described various embodiments of the present invention are independently applicable or two or more thereof are simultaneously applicable and redundant description is omitted for clarity.

In FIG. 13, the above description of the eNB 10 may be equally applied to a relay corresponding to a downlink transmitting entity or an uplink reception entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for receiving, by a second cell, subframe pattern information on a first cell, the method comprising:
receiving, from the first cell, downlink almost blank subframe (ABS) pattern information for the first cell;
receiving, from the first cell, uplink ABS pattern information of the first cell,
wherein the downlink ABS pattern information does not explicitly indicate whether an ABS in a downlink ABS pattern corresponds to a zero power-ABS (z-ABS) or a reduced power-ABS (r-ABS), and
wherein whether the ABS in the downlink ABS pattern corresponds to the z-ABS or the r-ABS is implicitly indicated by a combination of the downlink ABS pattern information and the uplink ABS pattern information.

2. The method according to claim 1, wherein a subframe n is identified as the z-ABS when the subframe n is indicated as an ABS in the downlink ABS pattern information and a subframe n+k is indicated as an uplink ABS in the uplink ABS pattern information, and the subframe n is identified as the r-ABS when the subframe n is indicated as an ABS in the downlink ABS pattern information and the subframe n+k is not indicated as an uplink ABS in the uplink ABS pattern information.

3. The method according to claim 2, wherein k=4.

4. The method according to claim 1, wherein ABS status information on the uplink ABS is fed back from the second cell to the first cell.

5. A method for receiving, by a second cell, subframe pattern information on a first cell, the method comprising:
receiving, from the first cell, downlink almost blank subframe (ABS) pattern information of the first cell;

receiving, from the first cell, Tx power information of a downlink ABS, wherein the downlink ABS pattern information explicitly indicates whether an ABS in a downlink ABS pattern corresponds to a zero power-ABS (z-ABS) or a reduced power-ABS (r-ABS), and wherein an uplink ABS pattern on the first cell is implicitly indicated based on whether the ABS in the downlink ABS pattern corresponds to the z-ABS or the r-ABS.

6. The method according to claim 5, wherein a subframe n+k is identified as an uplink ABS when a subframe n corresponds to the z-ABS, and the subframe n+k is identified as an uplink normal subframe when the subframe n corresponds to the r-ABS.

7. The method according to claim 6, wherein k=4.

8. The method according to claim 5, wherein a frequency domain inter-cell interference coordination (ICIC) message is transmitted by the first cell to the second cell.

9. The method according to claim 8, wherein it is determined that the frequency domain ICIC message with respect to the subframe n+k is not valid when the subframe n corresponds to the z-ABS, and it is determined that the frequency domain ICIC message with respect to the subframe n+k is valid when the subframe n corresponds to the r-ABS.

10. The method according to claim 9, wherein k=4.

11. The method according to claim 8, wherein the frequency domain ICIC message includes at least one of interference overload indication (IOI) and high interference indication (HII).

12. An eNB of a second cell for receiving subframe pattern information on a first cell, the eNB comprising:
   a receiver configured to receive a signal from the first cell; and
   a processor for controlling the eNB,
   wherein the processor is configured to:
      receive, from the first cell, downlink almost blank subframe (ABS) pattern information of the first cell, and
      receive, from the first cell, uplink ABS pattern information of the first cell,
   wherein the downlink ABS pattern information does not explicitly indicate whether an ABS in a downlink ABS pattern corresponds to a zero power-ABS (z-ABS) or a reduced power-ABS (r-ABS), and
   wherein whether the ABS in the downlink ABS pattern corresponds to the z-ABS or r-ABS is implicitly indicated by a combination of the downlink ABS pattern information and the uplink ABS pattern information.

13. An eNB of a second cell for receiving subframe pattern information on a first cell, the eNB comprising:
   a receiver configured to receive a signal from the first cell; and
   a processor for controlling the eNB,
   wherein the processor is configured to:
      receive, from the first cell, downlink almost blank subframe (ABS) pattern information of the first cell, and
      receive, from the first cell, Tx power information on a downlink ABS of the first cell,
   wherein the downlink ABS pattern information explicitly indicates whether an ABS in a downlink ABS pattern corresponds to a zero power-ABS (z-ABS) or a reduced power-ABS (r-ABS), and
   wherein an uplink ABS pattern on the first cell is implicitly indicated based on whether the ABS in the downlink ABS pattern corresponds to the z-ABS or the r-ABS.

* * * * *